United States Patent
Marshall

(10) Patent No.: US 10,436,008 B2
(45) Date of Patent: Oct. 8, 2019

(54) DOWN-HOLE GAS SEPARATION SYSTEM

(71) Applicant: Modicum, LLC, Odessa, TX (US)

(72) Inventor: Gary Marshall, Midland, TX (US)

( * ) Notice: Subject to any disclaimer, the term of this patent is extended or adjusted under 35 U.S.C. 154(b) by 119 days.

(21) Appl. No.: 15/542,498

(22) PCT Filed: Jan. 7, 2016

(86) PCT No.: PCT/US2016/012419
§ 371 (c)(1),
(2) Date: Jul. 10, 2017

(87) PCT Pub. No.: WO2016/112155
PCT Pub. Date: Jul. 14, 2016

(65) Prior Publication Data
US 2018/0280834 A1 Oct. 4, 2018

Related U.S. Application Data

(60) Provisional application No. 62/101,937, filed on Jan. 9, 2015.

(51) Int. Cl.
*E21B 43/38* (2006.01)
*B01D 19/00* (2006.01)
(Continued)

(52) U.S. Cl.
CPC .............. *E21B 43/38* (2013.01); *B01D 19/00* (2013.01); *B01D 19/0031* (2013.01);
(Continued)

(58) Field of Classification Search
CPC ...... E21B 43/082; E21B 43/127; E21B 43/38; B01D 19/00; B01D 19/0031; B01D 19/0042; F04B 47/12
See application file for complete search history.

(56) References Cited

U.S. PATENT DOCUMENTS

| 1,973,650 A | 9/1934 | O'brien |
| 2,429,043 A | 10/1947 | Barnhart |

(Continued)

OTHER PUBLICATIONS

Evolution Oil Tools Inc, "Beam Pump Gas separator", http://eotools.com/pdfs/6/Beam%20Gas%20Separator_Rev.E0_22-Sep-11.pdf, retrieved Oct. 24, 2018.

(Continued)

*Primary Examiner* — Caroline N Butcher
(74) *Attorney, Agent, or Firm* — Charles Knobloch

(57) ABSTRACT

An apparatus, methods and systems for multi-configuration, multi-stage gas-liquid separation are presented. A production string is fitted with a shroud of size similar to the collars. Gaseous fluids intake into the upper portion of the shroud into a first chamber. Tubes or pipes collect the fluids for transport into the lower portion of a receiving chamber. Another plurality of tubes collect fluids in the portion of the receiving chamber above the first set for transport into a third chamber. Separated gases are collected and disposed. One or more receiving chambers are used. A final set of tubes or pipes transport the processed fluid to the bottom portion of a final chamber for delivery into the production string. The final chamber may be fitted with material-packed cylinders for further gas separation prior to delivery. The material-packed cylinders may be used alone as separators, or in combination with the receiving chambers.

10 Claims, 17 Drawing Sheets

(51) Int. Cl.
*F04B 47/12* (2006.01)
*E21B 43/08* (2006.01)
*E21B 43/12* (2006.01)

(52) U.S. Cl.
CPC ........ *B01D 19/0042* (2013.01); *E21B 43/082* (2013.01); *F04B 47/12* (2013.01); *E21B 43/127* (2013.01)

(56) References Cited

U.S. PATENT DOCUMENTS

| | | | |
|---|---|---|---|
| 2,652,130 A * | 9/1953 | Ferguson | E21B 43/38 137/118.06 |
| 4,241,787 A * | 12/1980 | Price | B01D 17/085 166/105 |
| 4,241,788 A | 12/1980 | Brennan | |
| 4,366,861 A | 1/1983 | Milam | |
| 4,515,608 A | 5/1985 | Clegg | |
| 4,531,584 A | 7/1985 | Ward | |
| 4,676,308 A | 6/1987 | Chow et al. | |
| 5,333,684 A * | 8/1994 | Walter | E21B 43/121 166/105.5 |
| 5,389,128 A | 2/1995 | Lopes | |
| 5,431,228 A | 7/1995 | Weingarten et al. | |
| 6,179,054 B1 | 1/2001 | Stewart | |
| 6,228,146 B1 * | 5/2001 | Kuespert | B01D 61/00 166/105.5 |
| 7,377,314 B2 | 5/2008 | Gonzalez | |
| 7,823,635 B2 * | 11/2010 | Wright | E21B 43/385 166/105.5 |
| 2007/0114020 A1 | 5/2007 | Brekke | |
| 2013/0032341 A1 | 2/2013 | Raglin | |
| 2014/0158343 A1 | 6/2014 | Cobb et al. | |

OTHER PUBLICATIONS

Evolution Oil Tools Inc, "Beam Gas Separator", https://eotools.com/images/pdfs/222-10-case_history_rev-a%20beam%20gas%20separator.pdf, retrieved Oct. 24, 2018.

Konylinski, L.S., et al, "Development and Field Test Results of an Efficient Downhole Centrifugal Gas Separator."

Schmoe, W. P., "Bottom-hole Gas Separators Increase Production."

Clegg, J.D., "Understanding and Combating Gas Interference in pumping wells."

Podio, A.L., et al, "Evaluation and Performance of Packer-Type Downhole Gas Separators."

Podio, A.L., et al, "Decentralized Continuous-flow Gas Anchor."

McCoy, J.N. et al, "An improved downhole gas separator," Petroleum Society of Canada Annual Technical Meeting.

Lackner, G., et al, "Effect of Viscosity on Downhole Gas Separation in a Rotary Gas Separator."

McCoy, James N. et al, "A Laboratory Study With Field Data of Downhole Gas Separators."

Bohorquez, R.R., et al, "Laboratory Testing of Downhole Gas Separators," SPE Annual Technical Conference and Exhibition.

Weingarten, J.S., et al, "Development and Testing of a Compact Liquid-Gas Auger Partial Separator for Downhole or Surface Applications."

* cited by examiner

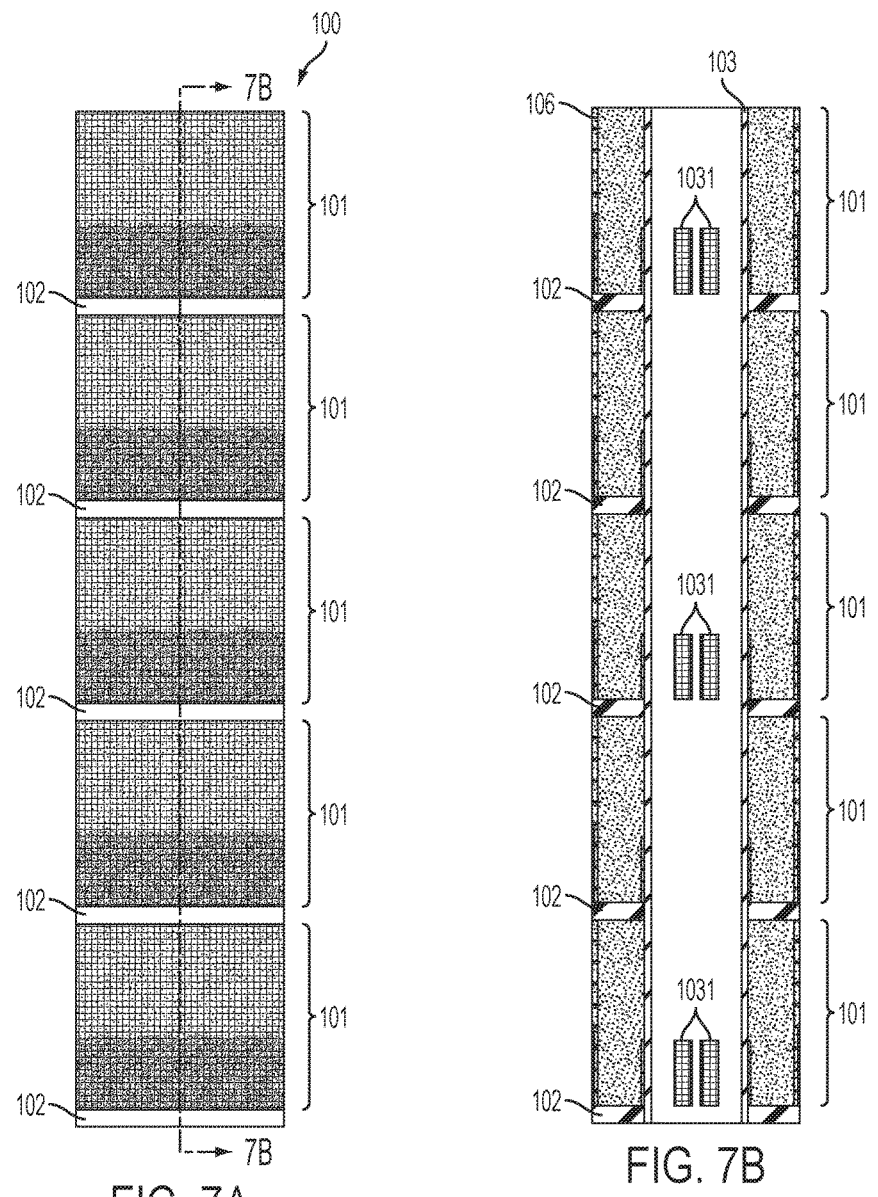

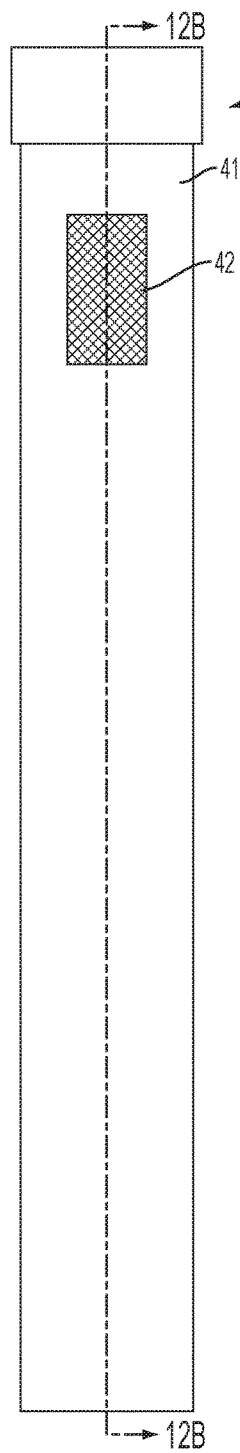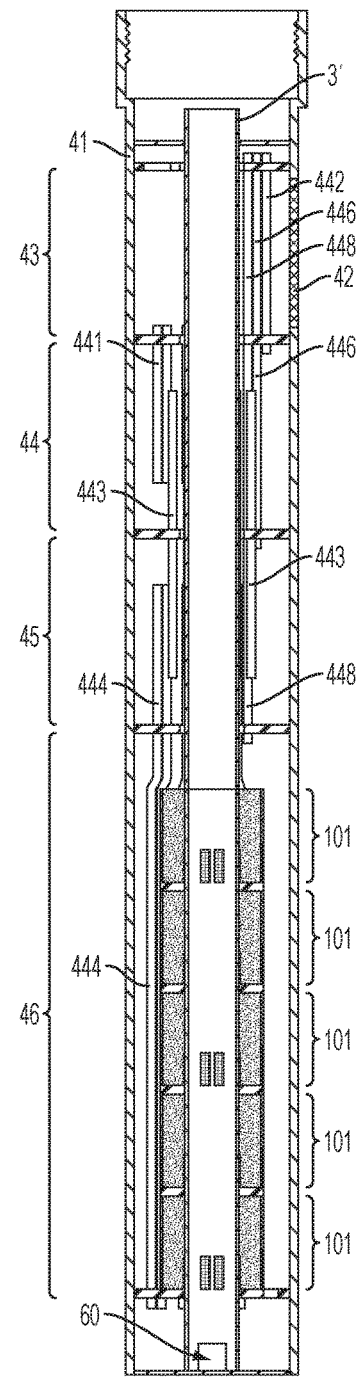
FIG. 12A
FIG. 12B

DOWN-HOLE GAS SEPARATION SYSTEM

CROSS REFERENCE TO RELATED APPLICATIONS

This application claims priority to U.S. Provisional Application 62/101,937 of filing date 9 Jan. 2015, entitled "Down-Hole gas Separation System". U.S. Provisional Application 62/101,937 of filing date 9 Jan. 2015, entitled "Down-Hole gas Separation System" is hereby incorporated by reference into this application in its entirety.

BACKGROUND OF THE INVENTION

1. Field of the Invention

Examples of the subject matter disclosed herein generally relate to apparatus, methods and systems for separating gases from liquids in a down-hole hydrocarbon production environment.

2. Discussion of Background

The present invention relates to developments in separating gases from hydrocarbon-bearing liquids that exist in oil reservoirs, with particular emphasis on extracting or separating the gases prior to the oil-bearing fluid reaching pumps. It is known that gases adversely affect pump efficiency and removal of gases prior to entry of the fluid into the pump is desired.

U.S. Pat. No. 1,973,650 to O'Brien discloses a GAS AND LIQUID SEPARATOR. O'Brien '650 discloses that separation of the gas from the oil is effected at the time the oil reverses its direction of movement. The separated gas continues upwardly through the passageway and flows outwardly through openings into the well casing through which it can be separately withdrawn exteriorly of the working barrel. The oil freed from gas flows downwardly through the chamber and is drawn into the tube through openings where it again reverses its direction of travel, flowing upwardly through the tube and working barrel. Any loose sand which is carried by the stream of oil in its circuitous passage through the separator, drops downwardly by gravity and due to its own inertia on lateral deflection of the stream from the chamber into the tube. However, O'Brien '650 fails to disclose a series of individual gas separation cylinders, a collection of downward conveying delivery tubes, burp tubes to convey upward separated gas. O'Brien '650 fails to disclose burp tubes to moderate the fluid levels in each separation cylinder and fails to provide structural components to amplify the effect of surface tension breakout.

U.S. Pat. No. 2,429,043 to Barnhart discloses a bottom hole gas anchor, the gas anchor having a housing of a maximum diameter size which can be safely deposited in the well so as to provide a maximum size expansion chamber which will permit the maximum reduction in the velocity of flow of the gas, liquids and solids from the formation to the pump. Barnhart '043 discloses that another object of the invention is to reduce the velocity of flow progressively step by step to a minimum so as to encourage the separation of the gases, liquids and solids. This separation is accomplished by providing a plurality of passages for the flow of the material in the assembly whereby the flow thru any other passage or passages after the first passage obtains a further reduction in the velocity of flow compared with the velocity in the first passage. Barnhart '043 is directed to a bottom hole gas anchor and not a production string gas separator. Barnhart '043 fails to disclose two sets of overlapping tubes. A first series of elongated tubes which downwardly overlap with a second series of upwardly overlapping elongated tubes to effect gas-liquid separation. Barnhart '043 fails to disclose use of polytetrafluoroethylene (PTFE) surfaced tubing, fails to disclose use of burp tubes, fails to disclose means for cascading a plurality of gas separator units/cylinders with associated gasketing system, fails to use a gravel or sand medium to further effect gas-liquid separation.

U.S. Pat. No. 4,241,788 to Brennan discloses a MULTIPLE CUP DOWNWELL GAS SEPARATOR. Each retention cup has a retention chamber which provides a fluid retaining capacity sufficient to momentarily retain well fluid flowing from the well so as to permit gas to escape from the fluid so retained and returned to the well. The difference in specific gravity between gassy well fluid and well fluid with gas removed creases circulation of well fluid through the retention cups and into the reservoir chamber, with each retention cup catching down falling well fluid that has been partially freed of entrained gas. Second stage separation of gas from well fluid is achieved by providing at least one opening or passageway from the reservoir chamber adapted to provide a gas exit between the well and the reservoir chamber.

U.S. Pat. No. 4,366,861 to Milam discloses a DOWN-HOLE GAS SEPARATOR. Milam '861 discloses a gas separator being secured to the lower end of the pump and generally comprises inner and outer concentrically arranged tubes extending downwardly within the well tubing. The well fluid contained in the well bore is drawn into the well casing and travels through a long, torturous upward and downward path through the well tubing and gas separator and to the surface of the well bore.

Milam '861 discloses attaching a separator directly to a rod pump, teaching away from attaching the separator to the production string. Further, being connected to the rod pump would limit the diameter of the separator to the inside diameter of the production string.

U.S. Pat. No. 4,676,308 to Chow et al. discloses a DOWN-HOLE GAS ANCHOR DEVICE. The device comprises a means to divert hydrocarbon production fluid from within a tubing string into the annulus of the well. This diversion turbulently mixes the fluid and releases free gas from the liquid. Thereafter, the liquid migrates downward while the free gas migrates upward to a gas collection apparatus.

Chow et al. '308 teaches away in that Chow '308 turbulently diverts the flow of production fluid and does not provide means for non-turbulently diverting the flow of production fluid to separate the gas from the liquids.

U.S. Pat. No. 5,389,128 to Lopes discloses a MULTIPLE, SELF-ADJUSTING DOWNHOLE GAS SEPARATOR. The multiple, self-adjusting downhole gas separator includes an external decanting pipe having perforations about the periphery thereof, and a concentric inner suction pipe equipped with inverted L-shaped suction pipe by-passes extending outwardly and downwardly from the periphery of the inner suction pipe. A plurality of respective retention cups are resiliently supported on the inner suction pipe by elastic elements.

U.S. Pat. No. 6,179,054 B1 to Stewart discloses a DOWN HOLE GAS SEPARATOR. A slotted gas separator for a down hole pump has an internal baffle that is angled to push the oil down into the chamber and the gas up to be released. The baffle has a roughened surface area with small, grainy protrusions that result in a jagged, coarse surface to agitate the liquid-gas mixture and separate out any gas. The large surface area of the baffle insures maximum contact to separate the oil and gas. The gas is released through slots on the top of the casing.

U.S. Pat. No. 7,377,314 B2 to Gonzalez discloses a DOWNHOLE GAS SEPARATOR. The downhole gas separator includes an external tube having a closed bottom and an open top; and an internal tube positioned eccentrically within the external tube and having an open bottom and a top adapted for connection to a production tube. The internal tube can alternatively be connected to a pump intake. The separator is positioned eccentrically within a casing, and provides for separation of gas from produced fluids before the fluids enter the production tube and/or pump.

US Patent Publication 2013/0032341 A1 to Raglin discloses a DOWN-HOLE GAS SEPARATOR. A baffle assembly in the gas separator is comprised of a series of baffles, each baffle extending between an inner wall of the central tube and an outer wall of the suction tube for a portion of the available space between the inner wall of the central tube and the outer wall of the suction tube, each baffle offset from the other baffles in the baffle assembly, wherein the baffle assembly is operable to continually redirect the fluid and gas as it travels through the central tube.

Brennan '788 & Milam '861 & Chow et al. '308 fail to disclose a cascaded separator having it separator components contained within a constant outside diameter to prevent binding or sanding up of the separator when deployed downhole. The upwardly open retention cups are exposed externally and subject to sanding up.

Brennan '788 & Milam '861 & Chow et al. '308 & Lopes '128 & Stewart '054 fail to disclose two sets of overlapping tubes. A first series of elongated tubes which downwardly overlap with a second series of upwardly overlapping elongated tubes to effect gas-liquid separation.

Brennan '788 & Milam '861 & Chow et al. '308 fail to disclose use of polytetrafluoroethylene (PTFE) tubing. Lopes '128 & Stewart '054 fail to disclose use of polytetrafluoroethylene (PTFE)-surfaced tubing.

Brennan '788 & Milam '861 & Chow et al. '308 & Lopes '128 & Stewart '054 fail to disclose use of burp tubes.

Brennan '788 & Milam '861 & Chow et al. '308 & Lopes '128 & Stewart '054 fail to use a gravel or sand medium to further effect gas-liquid separation.

Milam '861 & Chow et al. '308 & Lopes '128 & Stewart '054 fail to disclose means for cascading a plurality of gas separator units/cylinders with associated gasketing system.

The inventor indicates that old experiments included "cups" around a production pipe, open upward, therefore creating an upwardly open annular region around the pipe. Gaseous fluids would enter into the upwardly open "cup", providing time for gas to evolve before entering into the production pipe at the bottom of the "cup". This failed for various reasons, including the problem that the cup would fill with clay or sand or other debris and plug up. They would "sand up". The inventor believes that these problems have caused practitioners to reject using cups, and the art to teach away from use of cups. This has bothered the inventor for many years. The inventor now realizes that perhaps these problems may have been created by these experimental cups being greater diameter than the diameter of the pipe. Upon this realization, the inventor has sought ways to solve the plugging problem, resulting in the creation of an internal cup without a protruding diameter that will not "sand up."

BRIEF SUMMARY OF THE INVENTION

In a first set of examples, an apparatus is disclosed for gas separation from down-hole fluids, the apparatus including: a tubular housing sized to fit around a production string; an orifice positioned in an upper portion of the tubular housing for receiving down-hole fluids; a first chamber positioned in the upper portion of the tubular housing, in fluid communication with the outside of the tubular housing through the orifice; a first plurality of tubes having first open ends positioned and arranged in the lower portion of the first chamber; a second chamber or series of second chambers positioned and arranged below the first chamber, the first plurality of tubes having second open ends positioned and arranged in the second chamber or series of second chambers; an orifice in the second chamber positioned and arranged to expel gases; a second plurality of tubes having first open ends positioned and arranged in the second chamber or series of second chambers; a third chamber positioned and arranged below the second chamber or series of chambers, the second plurality of tubes having second open ends positioned and arranged in the third chamber; an orifice in the third chamber positioned and arranged to expel gases; one or more orifices into a production string, positioned and arranged in the third chamber; where the second open ends of the first plurality of tubes are positioned and arranged above the first open ends of the second plurality of tubes; where the one or more orifices into the production string are positioned and arranged above the second open ends of the second plurality of tubes; where the second chamber orifice for expelling gases is positioned and arranged above both the second open ends of the first plurality of tubes and the first open ends of the second plurality of tubes; and where the third chamber orifice for expelling gases is positioned and arranged above both the second open ends of the second plurality of tubes and the one or more orifices into the production string.

In a further example, the second chamber or series of chambers includes two or more intervening chambers where: the second open ends of the first plurality of tubes are positioned and arranged in a first intervening chamber; the first open ends of the second plurality of tubes are positioned and arranged in a last intervening chamber; and further includes: for each pair of adjacent intervening chambers, a respective intervening plurality of tubes having first open ends positioned and arranged in the first intervening chamber of the pair and second open ends disposed in the second intervening chamber of the pair; an orifice in one or more of the intervening chambers positioned and arranged to expel gases; and where the second open ends of the plurality of tubes of each intervening chamber are positioned and arranged above the first end openings of the plurality of tubes of that intervening chamber; and where each respective orifice for expelling gases is positioned and arranged above both the second open ends of the plurality of tubes of the respective intervening chamber and the first open ends of the plurality of tubes of the respective intervening chamber.

In further example, one or more stacked containers are positioned and arranged between the one or more orifices into the production string and the second open ends of the second plurality of tubes, each one or more stacked containers including: a top barrier disposed above one or more orifices into the production string; a bottom barrier disposed below one or more orifices into the production string; a first coated screen positioned and arranged across the one or more orifices; a second screen disposed between the top barrier and the bottom barrier and positioned and arranged to form an exterior surface of the container, forming a volume; a fluid barrier material disposed about a lower portion of the second screen, forming a cup within the volume between the first coated screen and the second coated screen; and a second material disposed in the volume between the first coated screen and the second coated screen.

In further example, the second material includes of one or more of the following: sand, No. 17 sand, ceramic beads. In further example, the first coated screen includes a screen coated with epoxy, the epoxy impregnated with a medium. In further example, the medium includes one or more of the following: sand, No. 17 sand, ceramic, glass, rocks. In further example, the tubes include polytetrafluoroethylene (PTFE).

In another set of examples, an apparatus is disclosed for gas separation from down-hole fluid, the apparatus including: a pipe, a shroud disposed around the pipe; a top chamber disposed longitudinally along the annular volume between the shroud and the pipe; one or more orifices in the shroud, opening into the top chamber; a bottom chamber disposed longitudinally along the annular volume between the shroud and the pipe; one or more orifices in the pipe, opening into the bottom chamber; an intermediate chamber disposed longitudinally along the annular volume between the shroud and the pipe between the top chamber and the bottom chamber; a first plurality of tubes having a first set of ends disposed in the top chamber and a second set of ends disposed in the intermediate chamber, providing fluid communication between the top chamber and the intermediate chamber; and a second plurality of tubes having a first set of ends disposed in the intermediate chamber and a second set of ends disposed in the bottom chamber, providing fluid communication between the intermediate chamber and the bottom chamber.

In further example, the apparatus includes an orifice in the intermediate chamber positioned and arranged to expel gases. In further example, the apparatus includes an orifice in the bottom chamber positioned and arranged to expel gases. In further example, the apparatus includes an orifice in the intermediate chamber positioned and arranged to expel gases and an orifice in the bottom chamber positioned and arranged to expel gases.

In further example, the intermediate chamber includes: a plurality of sequential longitudinally adjacent chambers; and a plurality of tubes disposed between each adjacent pair of sequential adjacent chambers, providing fluid communication between the adjacent pairs of chambers. In further example, the apparatus includes an orifice in the intermediate chamber positioned and arranged to expel gases. In further example, the apparatus includes an orifice in the bottom chamber positioned and arranged to expel gases. In further example, the apparatus includes an orifice in the intermediate chamber positioned and arranged to expel gases and an orifice in the bottom chamber positioned and arranged to expel gases.

In another set of examples, a method is disclosed for gas separation from down-hole fluids, including the steps of: receiving down-hole fluids into a first receiving chamber; transporting the received fluids from the first receiving chamber downward through a first plurality of tubes into a second receiving chamber or series of chambers, the first plurality of tubes having entrance openings in the first receiving chamber and exit openings in the second receiving chamber; transporting fluids in the second receiving chamber downward through a second plurality of tubes into a third chamber; transporting fluids in the third chamber through one or more orifices into a pipe, whereby fluids separated from gas is extracted; expelling gases in the second receiving chamber through a second orifice; expelling gases in the third chamber through a third orifice; where the exit openings of the first plurality of tubes are positioned and arranged above the entrance openings of the second plurality of tubes; where the one or more orifices into the pipe are positioned and arranged above the exit openings of the second plurality of tubes; where the first orifice for expelling gases is positioned and arranged above both the exit openings of the first plurality of tubes and the entrance openings of the second plurality of tubes; and where the second orifice for expelling gases is positioned and arranged above both the exit openings of the second plurality of tubes and the one or more orifices into the pipe.

In further example, the second chamber or series of chambers includes two or more intervening chambers, the transporting of the received fluids from the receiving chamber downward through the first plurality of tubes including: transporting the received fluids from the receiving chamber downward through the first plurality of tubes into a first intervening chamber; transporting fluids in the last intervening chamber downward through the second plurality of tubes into the third chamber; transporting the received fluids from each intervening chamber downward through a respective intervening plurality of tubes into the next intervening chamber; expelling gases in one or more of the intervening chambers, each through a respective orifice; where the exit openings of the plurality of tubes of each intervening chamber are positioned and arranged above the entrance openings of the respective plurality of tubes of that intervening chamber; and where each respective orifice for expelling gases is positioned and arranged above both the exit openings of the plurality of tubes of the respective intervening chamber and the entrance openings of the plurality of tubes of the respective intervening chamber.

In further example, transporting fluids in the third chamber through one or more orifices into a pipe further includes: passing the fluids from the third chamber through a screen downward into a material filled chamber; passing the fluids from the material filled chamber through a coated screen through the one or more orifices into the pipe.

In further example, the material includes of one or more of the following: sand, No. 17 sand, ceramic beads. In further example, the coated screen includes a screen coated with epoxy, the epoxy impregnated with a medium. In further example, the medium includes one or more of the following: sand, No. 17 sand, ceramic, glass, rocks. In further example, the tubes include polytetrafluoroethylene (PTFE).

In one set of examples, a method is disclosed for fabrication of a gas-liquid separator including the steps of: perforating a plurality of orifices into a production string; applying a first screen about the orifices; coating the first screen with epoxy; blowing the epoxy coated screen; disposing a medium on the epoxy coated screen prior to the epoxy setting; enclosing a second screen about the first screen forming a chamber; sealing the area between the first screen and the second screen on the bottom, below the orifices; disposing a fluid barrier material about a lower portion of the second screen, forming a cup within the volume between the first coated screen and the second coated screen; adding a second material into the volume between the first screen and the second screen; and sealing the area between the first screen and the second screen on the top, above the orifices.

In further example, the second material includes one or more of the following: sand, No. 17 sand, ceramic beads. In further example, the medium includes one or more of the following: sand, No. 17 sand, ceramic, glass, rocks.

In another set of examples, an apparatus is disclosed for gas separation from down-hole fluids, the apparatus including: a plurality of orifices on a production string; a first screen disposed about the orifices; an epoxy coating disposed on the first screen; a medium affixed onto the epoxy coating; a second screen disposed about the first screen, forming a chamber; a first seal, sealing the area between the first screen and the second screen on the bottom, below the orifices; a fluid barrier material disposed about a lower portion of the second screen, forming a cup within the volume between the first coated screen and the second coated screen; a second material disposed in the volume between the first screen and the second screen; and a second seal, sealing the area between the first screen and the second screen on the top, above the orifices.

In further example, the second material includes one or more of the following: sand, No. 17 sand, ceramic beads. In further example, the medium includes one or more of the following: sand, No. 17 sand, ceramic, glass, rocks.

In one set of examples, disclosed is a multi-configuration, multi-stage gas-liquid separation system, the system including: a tubular housing sized to fit around a production string; an orifice positioned in an upper portion of the tubular housing for receiving down-hole fluids; a first chamber positioned in the upper portion of the tubular housing, in fluid communication with the outside of the first tube through the orifice; one or more Marshall loop cylinders, in fluid communication with the first chamber; a third chamber positioned and arranged below the one or more Marshall loop cylinders, in fluid communication with the one or more Marshall loop cylinders; and one or more orifices into a production string, positioned and arranged in the third chamber to receive one or more Stinger cylinders.

In a further example, the one or more Stinger cylinders includes: a plurality of orifices on a production string; a first screen disposed about the orifices; an epoxy coating disposed on the first screen; a medium affixed onto the epoxy coating; a second screen disposed about the first screen, forming a chamber; a first seal, sealing the area between the first screen and the second screen on the bottom, below the orifices; a fluid barrier material disposed about a lower portion of the second screen, forming a cup within the volume between the first coated screen and the second coated screen; a second material disposed in the volume between the first screen and the second screen; and a second seal, sealing the area between the first screen and the second screen on the top, above the orifices.

BRIEF DESCRIPTION OF THE SEVERAL VIEWS OF THE DRAWING

FIG. 3A is looking upward, relative to the displayed orientation of FIG. 2A. FIGS. 3B through 3E are looking downward, relative to the displayed orientation of FIG. 2A.

FIG. 4C illustrates a detail 3-D view of staging area 43. FIG. 4D illustrates a detail 3-D view of a first Marshall loop cylinder area 44. FIG. 4E illustrates a detail 3-D view of a second Marshall loop cylinder area 45. FIG. 4F illustrates a detail 3-D view of delivery chamber area 46. FIG. 4G illustrates a detail 3-D view of bottom of production string 3, perforation slot 60, and bottom plate 58.

FIG. 7A illustrates a front vertical elevation view of the separator of configuration "B" (the "Stinger", comprising five "Stinger cylinders" in this example), with location and viewing orientation indicated of vertical cut section view 7B.

FIG. 7B illustrates a vertical cut section view of FIG. 11A, looking to the right, relative to the displayed orientation of FIG. 7A.

FIG. 9 is looking upward, relative to the displayed orientation of FIG. 8.

FIG. 12A illustrates a front vertical elevation view of the separator of configuration "C", with location and viewing orientation indicated of vertical cut section view 12B.

FIG. 12B illustrates a vertical cut section view of FIG. 12A, looking to the right, relative to the displayed orientation of FIG. 12A. FIG. 12B illustrates staging area 43, first Marshall loop cylinder area 44, second Marshall loop cylinder area 45, and delivery chamber area 46 configured with five Stinger cylinders 101.

DETAILED DESCRIPTION

In several of the examples disclosed herein, the inventor is applying a concept he is calling "surface retention breakout" to structural configurations of positioned and arranged components for the purpose of separating gas and liquid from gas-liquid fluid mixtures. Here, the inventor's use of the term "surface retention breakout" is applied to his concept of using the velocity of two elements travelling into or across any medium or surface, causing the two to separate based on their differences in the velocity, likely caused by the medium or surface having a greater or less friction effect on the viscosity differential between the two elements. "Break out" is also where gaseous liquid begins to form bubbles. In particular applications, the gas and liquid separation is for hydrocarbon production. In further particular applications, the gas and liquid separation is for hydrocarbon production from oil wells and further for the purpose of reducing air-lock strain on pumps used to produce the hydrocarbon liquids.

Figure 1:
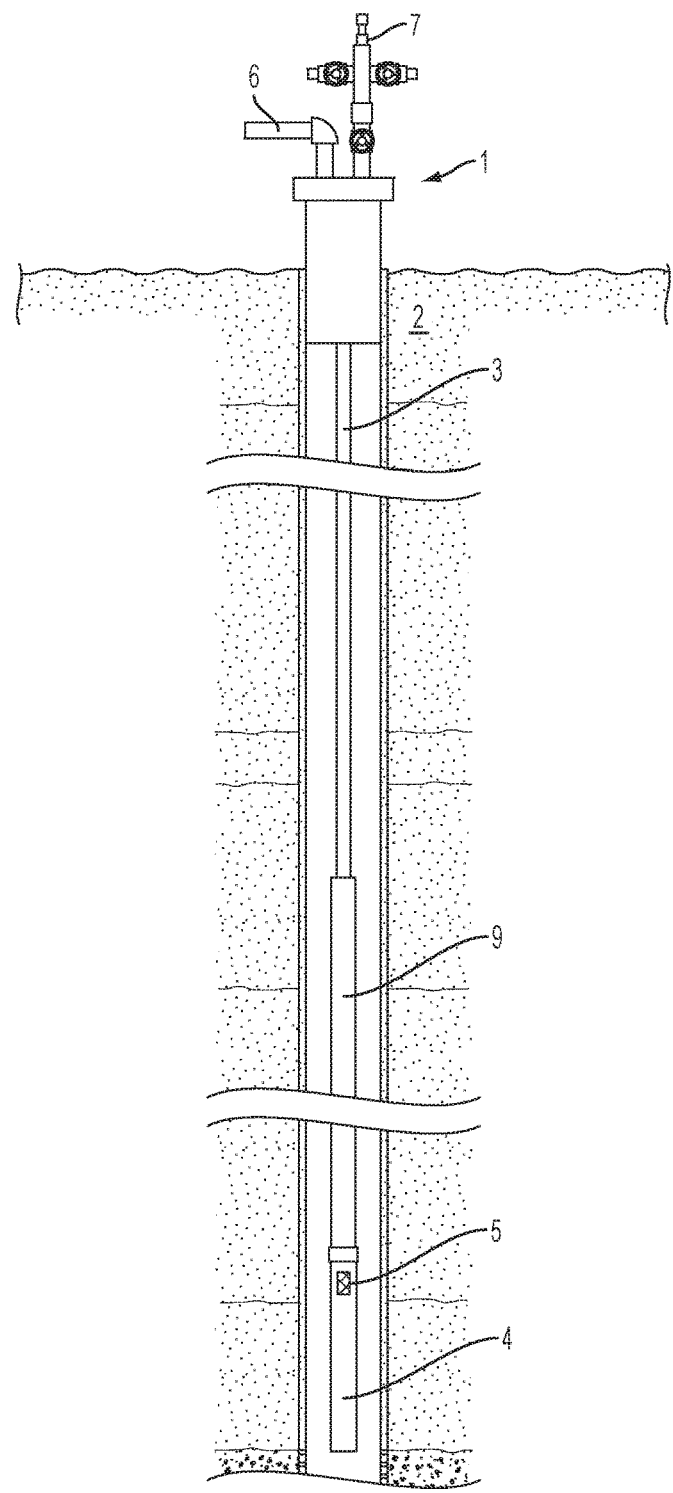
FIG. 1 illustrates a cross section elevation view of a production oil well with an artificial lift motor and an example of the separator of configuration "A" or "C", in-hole, near a producing geologic formation.

FIG. 1 illustrates a cross section elevation view of a production oil well 1 with an artificial lift motor and an example of the separator 4 of configuration "A" or "C", in-hole, near a producing geologic formation. In this example, production oil well 1 penetrates the Earth 2 through a cased hole. In other examples, the hole is uncased or partially cased. In this example, a production string 3 carries an artificial lift motor 9 down hole. Below artificial lift motor 9, separator 4 hangs off of artificial lift motor 9. An intake-exhaust slot 5 near the top of separator 4 provides fluid communication between the annulus of the well and the inside of separator 4. Oil production, where the oil is mixed with gas, exits the producing geologic formation and into the annulus between the casing and the production string/separator. The oil-gas mixture is drawn into the intake-exhaust slot 5 due to the pressure draw of artificial lift motor 9 and/or gravity. Piping 6 illustrates piping for relief of annulus gas and fittings 7 illustrate production pipe outtake for the oil. Artificial lift motor 9 receives oil from separator 4 below, the oil having had gas removed from the oil-gas mix by separator 4. Intake-exhaust slot 5 enables separated gases inside separator 4 to escape to the annulus between the casing and the production string/separator, where ultimately gas is gathered from the annulus by piping 6 for topside recovery.

Figure 2A:
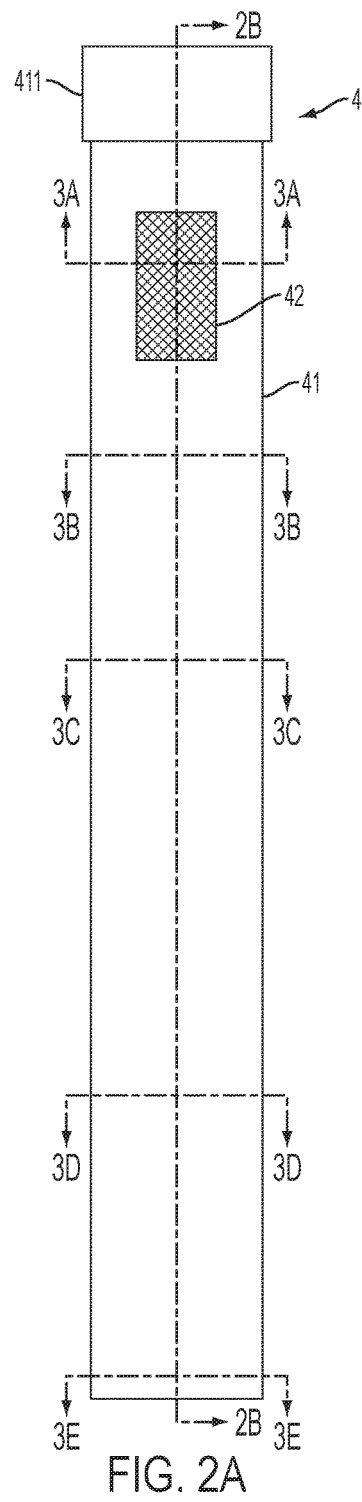
FIG. 2A illustrates a front vertical elevation view of the separator of configuration "A", with locations and viewing orientations indicated of vertical cut section view 2B and horizontal cut sectional views 3A through 3E.

FIG. 2A illustrates a front vertical elevation view of the separator 4 of configuration "A", with locations and viewing orientations indicated of vertical cut section view 2B and horizontal cut sectional views 3A through 3E. The outer cylinder of separator 4 in this example is a shroud 41 with an intake-exhaust slot 5 that is, in one example, fitted or otherwise positioned and arranged with a debris screen 42. In one example, threaded collar 411 at the top of separator 4 enables attachment of separator 4 to the production string, such as attachment to the pin of artificial lift motor 9. Debris screen 42 reduces the amount of solids and other debris from entering separator 4. In one example, the outer cylinder or shroud is a tubular housing. In one example, shroud 41 is a piece of five and one-half inch (5½") outside diameter pipe. In one example, debris screen 42 is a wire mesh fitted into or otherwise covering intake-exhaust slot 5.

In one example the opening of intake-exhaust slot 5 is three inches (3") wide by 24 inches (24") long, disposed approximately four inches (4") from the top collar 411. In one example, separator 4 is fourteen feet (14') long, with intake-exhaust slot 5 positioned near the top, having a length in the longitudinal direction of 24 inches and width of three inches (3"). In one example, the separator is configured to hold "Stinger" cylinders, as will be disclosed herein below. In one example, for a separator configured to hold eight "Stinger" cylinders, the longitudinal length of the separator is twenty-two feet (22'). In one example, for a separator configured to hold twenty-four (24) "Stinger" cylinders, the longitudinal length of the separator is sixty feet (60'). Other separator lengths are possible and desired, depending on the selected number of "Stinger" cylinders and/or "Marshall Loop" cylinder areas, as will be herein after disclosed and described.

Figure 2B:
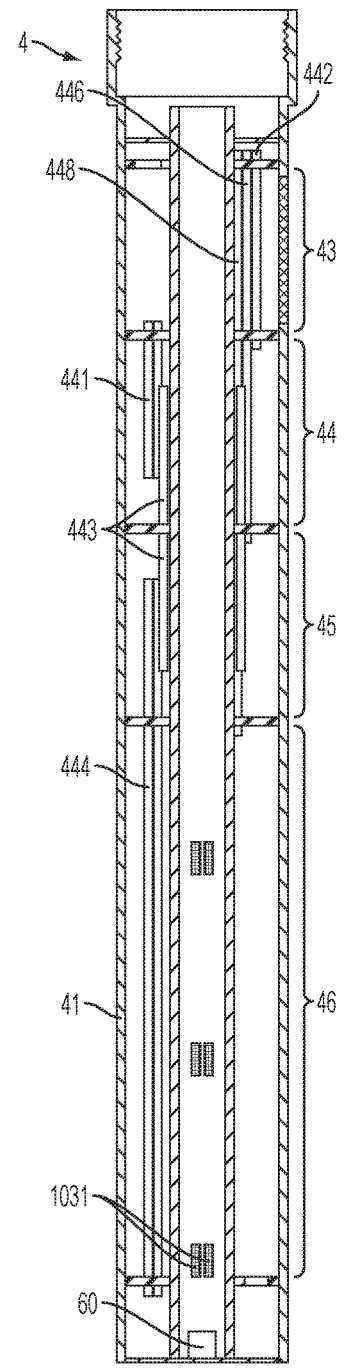
FIG. 2B illustrates a vertical cut section view of FIG. 2A, looking to the right, relative to the displayed orientation of FIG. 2A.

FIG. 2B illustrates a vertical cut section view of FIG. 2A, looking to the right, relative to the displayed orientation of FIG. 2A. Separator 4 is contained within shroud 41. A piece of production string 3 runs longitudinally down the central axis of separator 4. As illustrated in this example, the length of separator 4 is divided into four areas 43, 44, 45, 46, separated by sealing gaskets.

Staging Area.

The top sealed area, called the staging area 43, contains intake-exhaust slot 5 and is, therefore, in fluid communication with the well annulus. Staging area 43, therefore, forms an annular region between shroud 41 and production string 3.

In one example, staging area 43 is three feet (3') long, given an outside diameter of five and one-half inches (5½"). Details of staging area 43 will be presented in the following illustrations. In one example, production string 3 has an outside diameter of two and three eighths inches (2⅜"). In one example, production string 3 is a piece of J-55 pipe, or equivalent.

First Loop Cylinder Area.

A loop cylinder area 44 is positioned below staging area 43 and separated from staging area 43 by a sealing gasket. In one example, loop cylinder area 44 is two feet (24") long, given an outside diameter of five and one-half inches (5½"). Entry transfer tubes 441 have a first terminating ("entry") end near the bottom of staging area 43 and a second terminating ("exit") end further downward below, extending toward the bottom end of loop cylinder area 44. In one example, entry transfer tubes 441 extend approximately ¾ the distance towards the bottom of loop cylinder area 44. In one example, entry transfer tubes 441 extend downward into loop cylinder area 44 eighteen inches (18"), therefore having a length of approximately twenty inches (20") to account for passage through a sealing gasket and some protrusion from the floor of staging area 43. In one example, the entry ends are crimped to further secure the tubes in place. These entry transfer tubes 441 provide fluid communication between staging area 43 and loop cylinder area 44.

In one example, entry transfer tubes 441 are tubes having an inside diameter of three-eighths inch (⅜" ID) and outside diameter of one-half inch (½" OD). In one example, entry transfer tubes 441 are made of material rated at 600 degree Fahrenheit temperature. In one example, entry transfer tubes 441 are made of virgin polytetrafluoroethylene (PTFE) tubing. In one example, tubes having a polytetrafluoroethylene (PTFE)-coated inside surface, or equivalent surface, are used. In one example, ten (10) entry transfer tubes 441 are used. In other examples, a plurality of entry transfer tubes 441 are used, more or fewer tubes as required to effect liquid-gas separation in the diameter and length available.

First Burp Tube.

Figure 3A:
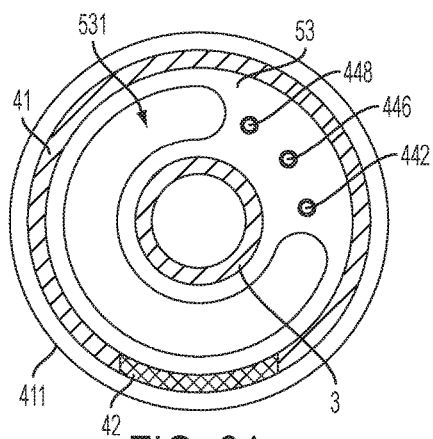
FIGS. 3A through 3E illustrate respective horizontal cut sectional views of FIG. 2A.
Figure 4A:
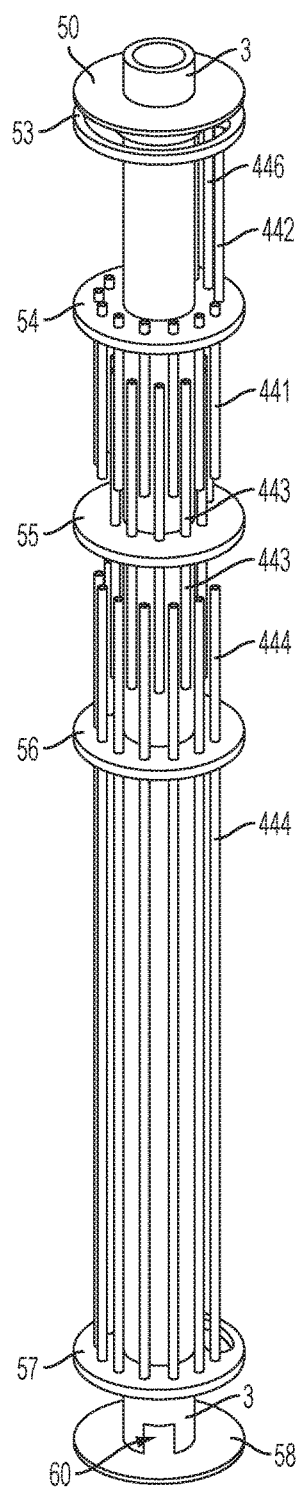
FIG. 4A illustrates a 3-D view of the separator of configuration "A", with shroud 41 removed for clarity.
Figure 4B:
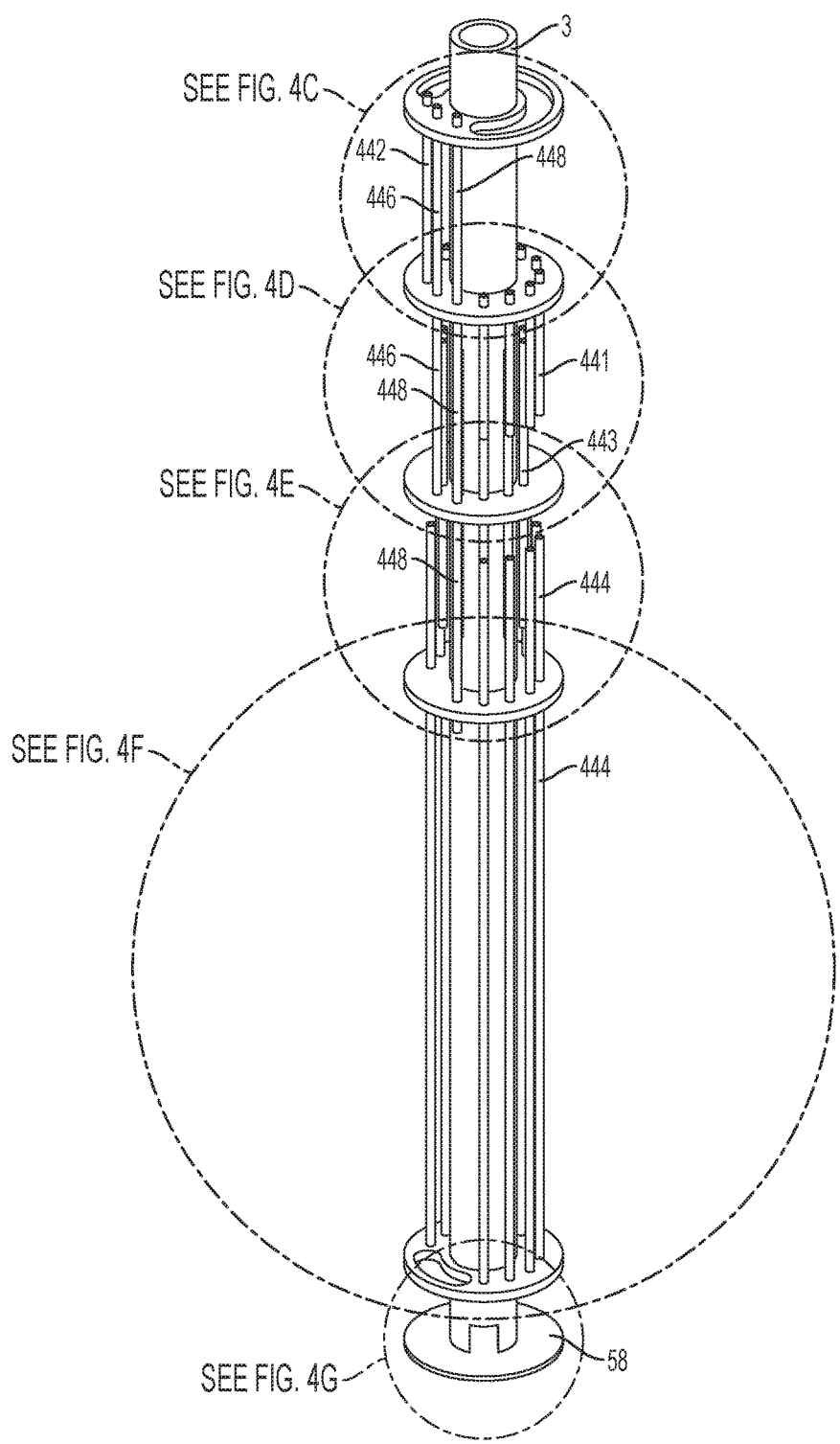
FIG. 4B illustrates a 3-D view of the separator of configuration "A", rotated to show burp tubes 442, 446, 448 and with shroud 41 and top plate 50 removed for clarity. The locations are indicated for detail views 4C through 4G.
Figure 4C:
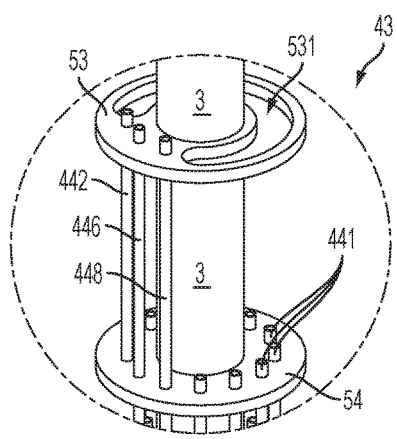
FIGS. 4C through 4G illustrate detail 3-D views of sections of the separator of configuration "A".

A burp tube 442 is shown which terminates within staging area 43. In this illustrated example, burp tube 442 has a first termination near the top of staging area 43 and a second termination near the top of loop cylinder area 44. Burp tube 44, in one example, collects gases accumulating in loop cylinder area 44 for transportation and disposal in the upper portion of staging area 43. A non-sealing gasket or guide (53, as shown in FIG. 3A, 4A, 4C) positions and arranges the first terminations of the burp tubes, near the top of the staging area. In one example, the entry ends are crimped to further secure the tubes in place. In one example, one or more burp tubes are replaced with a single burp tube, forming a burp tube "bus", as will be described further herein below.

Second Loop Cylinder Area.

Figure 3B:
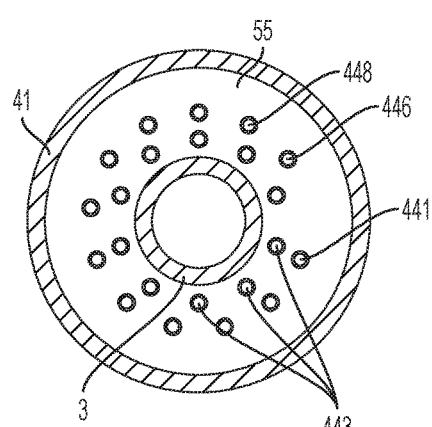
Figure 4D:
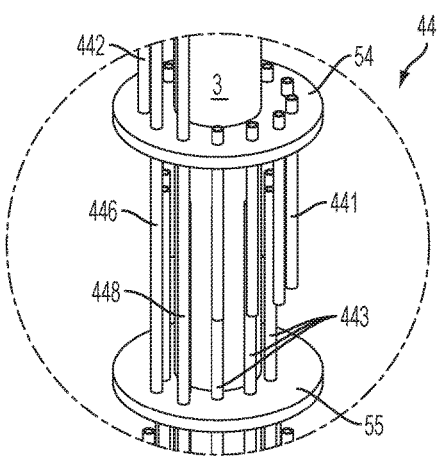
Figure 4E:
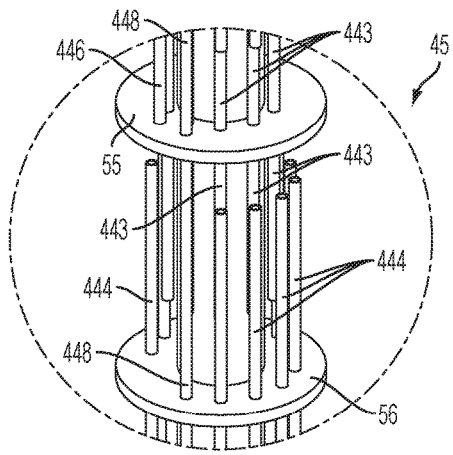

In this illustrated example, a loop cylinder area 45 is positioned below loop cylinder area 44 and separated from loop cylinder area 44 by a sealing gasket (55, as shown in FIG. 3B, 4A, 4E). In one example, loop cylinder area 45 is eighteen inches (18") long, given an outside diameter of five and one-half inches (5½"). Exit transfer tubes 443 have a first terminating ("entry") end in loop cylinder area 44, above the second terminating ends of entry transfer tubes 441, and a second terminating ("exit") end further downward below, extending in this example toward the bottom end of loop cylinder area 45. In one example, exit transfer tubes 443 extend upward approximately ¾ the distance from the bottom of loop cylinder area 44 to the top of bottom of loop cylinder area 44. In one example, exit transfer tubes 443 also extend downward approximately ¾ the distance from the top of loop cylinder area 45 to the top of loop cylinder area 45, becoming the entry tubes for loop cylinder area 45. In one example, exit transfer tubes 443 have a length of thirty-six inches (36") exclusive of the length to pass through the sealing gasket. Details of staging area 44 will be presented in the following illustrations.

In one example, ten (10) exit transfer tubes 443 are used. In other examples, a plurality of exit transfer tubes 443 are used, more or fewer tubes as required to effect liquid-gas separation in the diameter and length available.

For convenience in nomenclature, the position and arrangement of the entry and exit transfer tubes within the configuration of one sealed loop cylinder area is called a "Marshall loop". For example, the combination of gaskets 54, 55 with tubes 441 and 443 and a burp tube 442, disposed around string 3 and enclosed by shroud 41, thus creating sealed chamber area 44, make up a "Marshall loop".

Second Burp Tube.

In one example, a burp tube 446 collects gases accumulating in loop cylinder area 45 for transportation and disposal in the upper portion of staging area 43.

FIG. 2B thus illustrates two loop cylinder areas 44 and 45 in this example. In alternate example, only one loop cylinder area is used. In other alternate examples, a number of loop cylinder areas are used.

Delivery Chamber Area.

In this illustrated example, a delivery chamber area 46 is positioned below loop cylinder area 45 and separated from loop cylinder area 45 by a sealing gasket. In one example, delivery chamber area 46 is eight feet (8') long, given an outside diameter of five and one-half inches (5½"). Delivery chamber tubes 444 have a first terminating ("entry") end in loop cylinder area 45, above the second terminating ("exit") ends of exit transfer tubes 443, and a second terminating ("exit") end further downward below, extending in this example toward the bottom end of delivery chamber area 46. In one example, the second terminating ("exit") end of delivery chamber tubes 444 is eight inches (8") from the bottom of separator 4. In one example, a perforation in production pipe 3 is positioned below the second ("exit") terminating end of delivery chamber tubes 444, in one example, four inches (4") below the second terminating end. In one example, delivery chamber tubes 444 have a length of approximately nine and one-half feet (9½'), exclusive of the length to pass through the sealing gasket. A non-sealing gasket or guide positions and arranges the second terminations of the delivery chamber tubes, near the bottom of the delivery chamber area. In one example, delivery chamber tubes 444 extend upward approximately ⅔ the distance from the bottom of loop cylinder area 45 to the top of loop cylinder area 45. Details of delivery chamber area 46 will be presented in the following illustrations.

In one example, ten (10) delivery chamber tubes 444 are used. In other examples, a plurality of delivery chamber tubes 444 are used, more or fewer tubes as required to effect liquid-gas separation in the diameter and length available.

Third Burp Tube.

In one example, a burp tube 448 collects gases accumulating in delivery chamber area 46 for transportation and disposal in the upper portion of staging area 43.

Production String Intake.

In one example, the bottom of production string 3, towards the bottom of delivery chamber area 46, is perforated with slot(s) 60 to receive liquids. In one example, two slots 60 are disposed 180 degrees to each other about production string 3, each slot 60 being two inches (2") wide and two inches (2") long. In one example, the total area of the slots is about equal or greater than the cross-sectional area of the inner diameter of the production string.

In one example, the Marshall loop separator is used with slots 1031 that are positioned, arranged, and disposed about production string 3 within the area of delivery chamber area 46. Slots 1031 form holes or perforations in the production string 3 to receive liquids into production string 3. In one example, the Marshall loop separator is configured and used without slot(s) 60. In one example, slots 1031 each are one inch (1") wide by three and one half inches (3.5") long. In one example, slots 1031 are positioned and arranged in side-by-side pairs, distanced laterally by one half inch (½") from each other. In one example, slots 1031 are longitudinally distanced from each other by twelve inches (12"), for example, to match the height of the Stinger cylinders, as will be more fully described herein below as configuration "C". In one example, each longitudinally distanced set of slots 1031 is positioned and arranged from each other by 180 degrees around the cylinder surface of production string 3, forming a stagger. For example, a first set of slots 1031 at the bottom is positioned at 0 degrees on the production string 3, the next set of slots 1031 up from the bottom is positioned at 180 degrees on the production string 3, the next set of slots 1031 up from the bottom is positioned at 0 degrees on the production string 3, the next set of slots 1031 up from the bottom is positioned at 180 degrees, etc.

In one example, slots 1031 are used with the Marshall loop separator combined with one or more stinger cylinders, as will be more fully described herein below as configuration "C".

In one example, the Marshall loop separator is configured and used without holes 1031 (not illustrated). Where holes 1031 and/or slot(s) 60 are positioned, arranged, and disposed, the openings are used to draw liquids into the production string. In one example, holes 1031 are used with the Marshall loop separator combined with one or more stinger cylinders, as will be more fully described herein below.

Separation Transport Tubes.

In one example, the tubes used are tubes having an inside diameter of three-eighths inch (⅜" ID) and outside diameter of one-half inch (½" OD). In one example, the tubes used are made of material rated at 600 degree F. temperature. In one example, the tubes used are made of virgin polytetrafluoroethylene (PTFE) tubing. In one example, tubes having a polytetrafluoroethylene (PTFE)-coated inside surface, or equivalent surface, are used. In one example, ten (10) transfer tubes are used. In other examples, a plurality of transfer tubes are used, more or fewer tubes as required to effect liquid-gas separation in the diameter and length available.

FIGS. 3A through 3E illustrate respective horizontal cut sectional views of FIG. 2A.

FIG. 3A is looking upward, relative to the displayed orientation of FIG. 2A and is in staging area 43. The circular pipe of shroud 41 encloses separator 4. As FIG. 3A is looking upward, the outer circle represents the edge of collar 411. A piece of production string 3 runs longitudinally down the central axis of separator 4 and does not open into this staging area 43. From the FIG. 3A location, looking upward, non-sealing perforated gasket or guide 53 is shown with non-sealing slot 531 enabling fluid communication from and to the upper portion of staging area 43. In one example, as illustrated, non-sealing slot 531 forms a C-shaped orifice. Above non-sealing slot 531 is sealing top plate 50 (shown in FIG. 4A). In this example, as illustrated, three burp tubes 442, 446, 448 pass through non-sealing gasket or guide 53, the burp tubes being positioned and arranged by the non-sealing gasket or guide 53. Debris screen 42 is shown positioned and arranged to cover the opening in shroud 41 of intake-exhaust slot 5.

FIG. 3B is looking downward, relative to the displayed orientation of FIG. 2A and is in loop cylinder area 44. The circular pipe of shroud 41 encloses separator 4. In this example, production string 3 runs longitudinally down the central axis of separator 4 and does not open into this loop cylinder area 44. From the FIG. 3B location, looking downward, perforated sealing gasket 55 is shown, preventing fluid communication between loop cylinder area 44 and loop cylinder area 45, except through exit transfer tubes 443. From the FIG. 3B location, cross sections of entry transfer tubes 441 are shown. In this example, as illustrated, two burp tubes 446, 448 pass through sealing gasket 55, on their respective way to the loop cylinder area 44 and delivery chamber area 46. Sealing gasket 55 positions and arranges exit transfer tubes 443 and two burp tubes 446, 448 as they pass from loop cylinder area 44 into loop cylinder area 45.

Figure 3C:
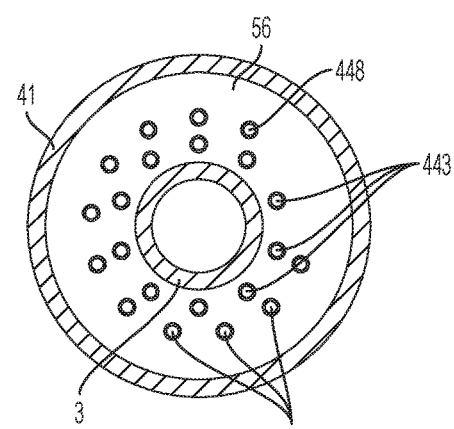

FIG. 3C is looking downward, relative to the displayed orientation of FIG. 2A and is in loop cylinder area 45. The circular pipe of shroud 41 encloses separator 4. In this example, production string 3 runs longitudinally down the central axis of separator 4 and does not open into this loop cylinder area 45. From the FIG. 3C location, looking downward, perforated sealing gasket 56 is shown, preventing fluid communication between loop cylinder area 45 and delivery chamber area 46, except through delivery chamber tubes 444. From the FIG. 3C location, cross sections of exit transfer tubes 443 are shown. In this example, as illustrated, one burp tubes 448 passes through sealing gasket 56, on its way to delivery chamber area 46. Sealing gasket 56 positions and arranges delivery chamber tubes 444 and burp tube 448 as they pass from loop cylinder area 45 into delivery chamber area 46.

Figure 3D:
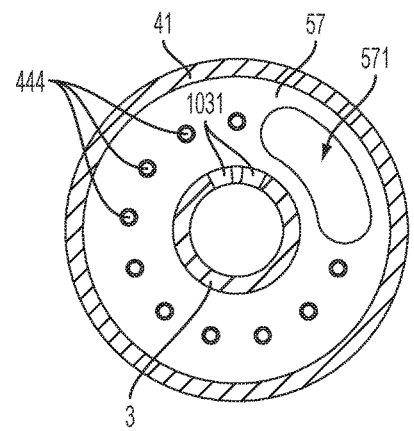

FIG. 3D is looking downward, relative to the displayed orientation of FIG. 2A and is in delivery chamber area 46. The circular pipe of shroud 41 encloses separator 4. A piece of production string 3 runs longitudinally down the central axis of separator 4 and does not open into this portion of delivery chamber area 46. From the FIG. 3D location, looking downward, perforated non-sealing gasket or guide 57 is shown with non-sealing slot 571 enabling fluid communication from and to the lower portion of delivery chamber area 46, in this example, the bottom of separator 4. In one example, as illustrated, non-sealing slot 571 forms a C-shaped orifice. Below non-sealing slot 571 is sealing bottom plate 58 (shown in FIGS. 3E and 4A).

Figure 3E:
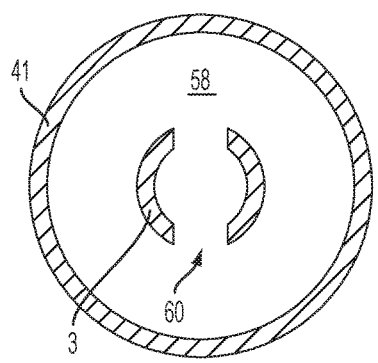

FIG. 3E is looking downward, relative to the displayed orientation of FIG. 2A and is below lower termination of delivery chamber tubes 444. The circular pipe of shroud 41 encloses separator 4. A piece of production string 3 runs longitudinally down the central axis of separator 4, terminating in perforation slots 60, opening into this portion of delivery chamber area 46, in this example, the bottom of separator 4. From the FIG. 3D location, looking downward, sealing bottom plate 58 forms the floor of bottom portion of delivery chamber area 46, in this example, the bottom of separator 4. In one example, the end portion of production string 3, with perforation slots 60, is attached at the end termination of production string 3 to bottom plate 58 (also shown in FIG. 4A).

Brief Summary of Basic Operation—Separator Configuration "A".

Thus, fluid communication from the outside annular regions between separator 4 and the well casing to the inside of production string 3 is effected, in this example, by entry through intake-exhaust slot 5 (and, in one example, through debris screen 42), into staging area 43, then through entry transfer tubes 441 into the lower portion of loop cylinder area 44, then to the upper portion of loop cylinder area 44 and into exit transfer tubes 443, then through exit transfer tubes 443 into the lower portion of loop cylinder area 45, then to the upper portion of loop cylinder area 45 and into delivery chamber tubes 444, then through delivery chamber tubes 444 into a lower portion of delivery chamber area 46, where perforation slots 60 of production string 3 at or near the bottom of separator 4 receive the fluid for uptake by artificial lift motor 9 or pumping action. Gases, as they separate from the liquid-gas mix, in this example, are collected by burp tubes 442, 446, 448 for expulsion into staging area 43 and ultimately through intake-exhaust slot 5 to the outside annular regions between separator 4 and the well casing. The volumes of the chambers (staging area 43, loop cylinder area 44, loop cylinder area 45, delivery chamber area 46) provide conditions for gas separation along with the flow path reversals caused by the overlapping of the tubes (entry transfer tubes 441, exit transfer tubes 443, delivery chamber tubes 444). The multiplicity of tubes, tube walls and tube inside diameters provide further conditions for gas separation.

FIG. 4A illustrates a 3-D view of the separator of configuration "A", with shroud 41 removed for clarity. FIG. 4B illustrates a 3-D view of the separator of configuration "A", rotated to show burp tubes 442, 446, 448 and with shroud 41 and top plate 50 removed for clarity. The locations are indicated for detail views 4C through 4G. FIG. 4B is rotated to better show the placement of burp tubes 442, 446, and 448. FIG. 4C through 4G illustrate detail 3-D views of sections of the separator of configuration "A".

A piece of production string 3 runs longitudinally down the central axis of separator 4. A sealing top plate 50 seals the top of shroud 41 and collar 411 from the annular chamber areas 43, 44, 45, 46, excepting through the opening of production string 3. Thus, sealing top plate 50 forms the top wall or roof of staging area 43 and seals staging area 43 from direct communication into the upper portion of shroud 41 and production passageway to topsides.

FIG. 4C illustrates a detail 3-D view of staging area 43. Non-sealing gasket or guide 53 is disposed about production string 3 below top plate 50 in staging area 43. A non-sealing slot 531 is an orifice disposed on non-sealing gasket or guide 53, enabling fluid communication from and to the upper portion of staging area 43. In one example, as illustrated, non-sealing slot 531 forms a C-shaped orifice. In this example, as illustrated, three burp tubes 442, 446, 448 (hidden from view in this FIG. 4A, but shown in rotated FIGS. 4B and 4C) pass through non-sealing gasket or guide 53, the burp tubes being positioned and arranged by the non-sealing gasket or guide 53. In one example, burp tube(s) 442, 446, and/or 448 are crimped on the end to additionally secure and affix its/their position in non-sealing gasket or guide 53. The ends of burp tubes 442, 446, 448, terminating in the higher portion of staging area 43, are positioned and arranged to exhaust gases into the upper portion of staging area 43.

FIG. 4D illustrates a detail 3-D view of a first Marshall loop cylinder area 44. Sealing gasket 54 prevents fluid communication between staging area 43 and loop cylinder area 44, except through entry transfer tubes 441. The top termination opening of entry transfer tubes 441 are positioned and arranged about sealing gasket 54, the top termination openings opening into the bottom portion of staging area 43. In the example as illustrated, ten transfer tubes 441 are used. Burp tubes 442, 446, 448 also sealingly pass through sealing gasket 54 into loop cylinder area 44. As illustrated in this example, the bottom termination opening of entry transfer tubes 441 are positioned and arranged in loop cylinder area 44, approaching, but not reaching, sealing gasket 55.

As illustrated in this example, the top termination opening of exit transfer tubes 443 are positioned and arranged in loop cylinder area 44, approaching, but not reaching, sealing gasket 54. In particular, the top termination openings of exit transfer tubes 443 are above the bottom termination openings of entry transfer tubes 441, forming an overlap of the tubes, in this example, an overlap of ten entry transfer tubes 441 and ten exit transfer tubes 443. The bottom termination of burp tube 442 terminates in loop cylinder area 44.

As can be realized, liquid-gas mixture entering staging area 43 proceeds into the plurality of entry transfer tubes 441. Some gas, if any, may separate out within staging area 43 and will not enter transfer tubes 441. This separated gas will disperse back into the annular region of the well, outside of shroud 41. The liquid-gas mixture will proceed through entry transfer tubes 441 into loop cylinder area 44. Upon exit from the bottom termination opening of entry transfer tubes 441 the liquid-gas mixture proceeds upward in order to enter the top termination openings of exit transfer tubes 443. Some of the gas, if any, may separate out within the expanded volume of loop cylinder area 44 (in one example, the volume of loop cylinder area is different from the accumulative volume of the entry transfer tubes) owing to the physical changes in velocity, pressure, direction of travel, surface tensions experienced by the liquid-gas mixture. Separated gas has opportunity to exit loop cylinder area 44 via the bottom termination of burp tube 442.

FIG. 4E illustrates a detail 3-D view of a second Marshall loop cylinder area 45. Sealing gasket 55 prevents fluid communication between staging area 44 and loop cylinder area 45, except through exit transfer tubes 443. Exit transfer tubes 443 are positioned and arranged about, and sealingly pass through, sealing gasket 55. The top termination openings of exit transfer tubes 443 are disposed above sealing gasket 55 (in loop cylinder area 44) and the bottom termination openings of exit transfer tubes 443 are disposed below sealing gasket 55 (in loop cylinder area 45). In the example as illustrated, ten transfer tubes 443 are used. Burp tubes 446, 448 also sealingly pass through sealing gasket 55 into loop cylinder area 45. As illustrated in this example, the bottom termination opening of exit transfer tubes 443 are positioned and arranged in loop cylinder area 45, approaching, but not reaching, sealing gasket 56.

As illustrated in this example, the top termination opening of delivery chamber tubes 444 are positioned and arranged in loop cylinder area 45, approaching, but not reaching, sealing gasket 55. In particular, the top termination openings of delivery chamber tubes 444 are above the bottom termination openings of exit transfer tubes 443, forming an overlap of the tubes, in this example, an overlap of ten exit transfer tubes 443 and ten delivery chamber tubes 444. The bottom termination of burp tube 446 terminates in loop cylinder area 45.

As can be realized, liquid-gas mixture entering loop cylinder area 44 proceeds into the plurality of exit transfer tubes 443. Some gas, if any, may separate out within loop cylinder area 44 and will not enter transfer tubes 443. As mentioned, this separated gas has opportunity to exit loop cylinder area 44 via the bottom termination of burp tube 442. The liquid-gas mixture will proceed through exit transfer tubes 443 into loop cylinder area 45. Upon exit from the bottom termination opening of exit transfer tubes 443 the liquid-gas mixture proceeds upward in order to enter the top termination openings of delivery chamber tubes 444. Some of the gas, if any, may separate out within the expanded volume of loop cylinder area 45 (in one example, the volume of loop cylinder area is different from the accumulative volume of the exit transfer tubes) owing to the physical changes in velocity, pressure, direction of travel, surface tensions experienced by the liquid-gas mixture. Separated gas has opportunity to exit loop cylinder area 45 via the bottom termination of burp tube 446.

Figure 4F:
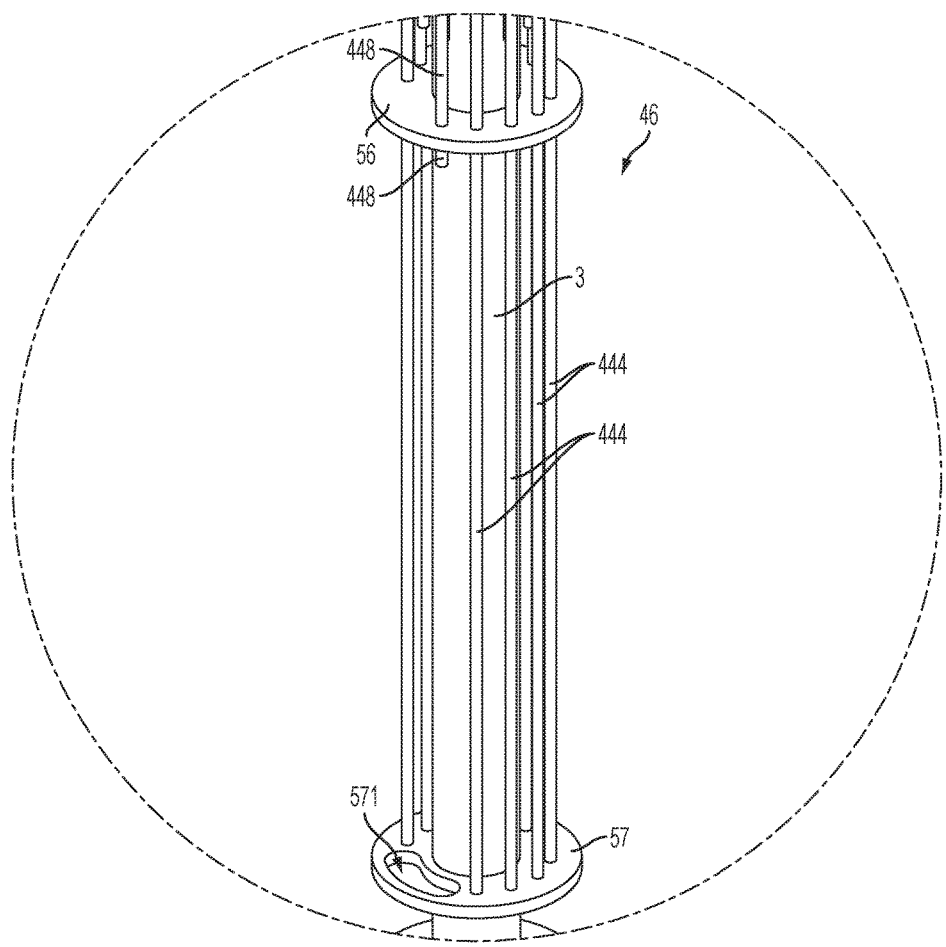

FIG. 4F illustrates a detail 3-D view of delivery chamber area 46. Sealing gasket 56 prevents fluid communication between loop cylinder area 46 and delivery chamber area 46, except through delivery chamber tubes 444. Delivery chamber tubes 444 are positioned and arranged about, and sealingly pass through, sealing gasket 56. The top termination openings of delivery chamber tubes 444 are disposed above sealing gasket 56 (in loop cylinder area 45) and the bottom termination openings of delivery chamber tubes 444 are disposed below sealing gasket 56 (in delivery chamber area 46). In the example as illustrated, ten transfer tubes 444 are used. Burp tube 448 also sealingly passes through sealing gasket 56 into delivery chamber area 46. As illustrated in this example, the bottom termination opening of delivery chamber tubes 444 are positioned and arranged in delivery chamber area 46, approaching, but not reaching, bottom plate 58.

Non-sealing gasket or guide 57 positions and arranges the bottom portion of delivery chamber tubes 444 such that the bottom termination openings of delivery chamber tubes 444 are above the bottom of production string 3. In one example, non-sealing gasket or guide 57 is with non-sealing slot 571, enabling fluid communication from and to the lower portion of delivery chamber area 46, in this example, the bottom of separator 4. In one example, non-sealing slot 571 forms a C-shaped orifice.

Figure 4G:
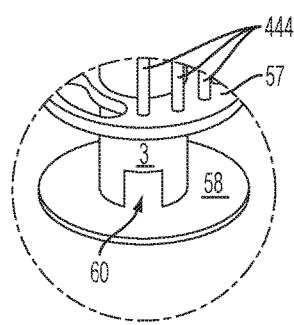

FIG. 4G illustrates a detail 3-D view of bottom of production string 3, perforation slot 60, and bottom plate 58. In one example, perforation slots 60 in production string 3 enable fluid flow between delivery chamber area 46 and the inside of production string 3. A sealing bottom plate 58 is disposed at the bottom of production string 3, forming a bottom seal to delivery chamber area 46 and the bottom portion of separator 4.

As can be realized, liquid-gas mixture entering loop cylinder area 45 proceeds into the plurality of delivery chamber tubes 444. Some gas, if any, may separate out within loop cylinder area 45 and will not enter delivery chamber tubes 444. As mentioned, this separated gas has opportunity to exit loop cylinder area 45 via the bottom termination of burp tube 446. The liquid-gas mixture will proceed through delivery chamber tubes 444 into delivery chamber area 46. Upon exit from the bottom termination opening of delivery chamber tubes 444 the liquid-gas mixture fills delivery chamber 46. Some of the gas, if any, may separate out within the expanded volume of delivery chamber 46 (in one example, the volume of delivery chamber area is different from the accumulative volume of the delivery chamber tubes) owing to the physical changes in velocity, pressure, direction of travel, surface tensions experienced by the liquid-gas mixture. Separated gas has opportunity to exit delivery chamber area 46 via the bottom termination of burp tube 448. In one example, perforation slots 60 at the bottom of production string 3 enable gas-reduced fluids to be drawn out from the bottom of delivery chamber area 46. In one example, perforation slots 1031 along the production string, in the delivery chamber area 46 of production string 3, enable gas-reduced fluids to be drawn out from delivery chamber area 46.

Brief Summary of Example Structure and Operation—Separator Configuration "A".

In this way, for example, the gaseous liquid entering from the open slotted first chamber 43 enters the first set (of ten) tubes 441 and travels downward ¾ of the way down into the second chamber 44. Upon exiting, the liquid experiences a drop in pressure (the annular region of the second chamber 44 having more volume than the ten tubes and less wall resistance) and also experience a change in direction (change from downward motion to upward motion of the fluid) and velocity in order to enter the top openings of the second set of tubes. As gas evolves from the gaseous liquid, the first burp tube 442 provides an escape of the free gas from the second chamber 44 and into the open slot first chamber 43.

The second set of tubes 443 continue downward through the seal 55 between the second 44 and third 45 chambers, terminating in a like manner (¾ down or 18", for example) into the third chamber 45. A second burp tube 446 at the top of the third chamber 45 allows free gas to escape from the third chamber 45, exiting into the open slot first chamber 43.

In a like manner, a third set of tubes 444 extend up from the seal between the third and fourth chamber, extending for example about ¾ the way up the third chamber and above the termination of the second set of tubes 443. The third set of tubes 444 extend down to the near the bottom of the fourth chamber 46, near (for about 11 feet till about a foot above, in one example) the sealed bottom 58 of the outside cylindrical pipe 41 of the annular pipe assembly 4. A non-sealing guide housing or gasket 57 positions the bottom ends of the third set of tubes 444 within the annular region between the outside cylindrical pipe 41 and the inner first pipe 3, a bit below the guide housing 57. This non-sealing area may be called a fifth chamber, but is in open fluid communication with the fourth chamber 46. In one example, a third burp tube 448 opens near the top of this fourth chamber 46 to collect any remaining free gas. This third burp tube 448 exits into the first open slot chamber 43.

In one example, in that fifth chamber area, below the bottom termination openings of the third set of tubes 444, the inner first pipe 3 extends downward to the sealed bottom 58 of the outside cylindrical pipe 41 of the annular pipe assembly 4. In one example, the inner first pipe 3 is a J-55 pipe. In that fifth chamber area, the bottom of the inner first pipe 3 is slotted 60 to receive liquid from the third (last) set of tubes 444.

Example Placement of Burp Tubes.

Figure 5A:
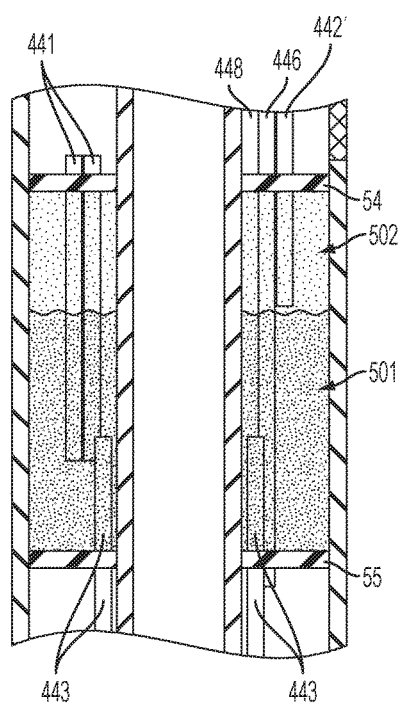
FIGS. 5A and 5B illustrate broken sectional views of a Marshall loop cylinder area with alternate placements of burp tube and resulting gas-fluid levels.
Figure 5B:
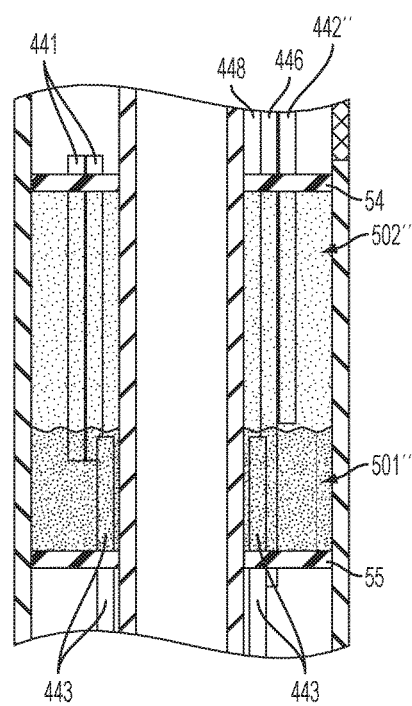

FIGS. 5A and 5B illustrate broken sectional views of a Marshall loop cylinder area with alternate placements of burp tube and resulting gas-fluid levels. In FIG. 5A, the bottom termination end of burp tube 442' is disposed a distance from the top of the cylinder chamber created by sealing gaskets 54 and 55. In this example, the top termination end of exit transfer tube(s) 443 is positioned below the bottom termination end of burp tube 442' while also positioned above the bottom termination end of entry transfer tube(s) 441. By positioning the terminating ends of tubes 442, 442', and 443 in such a manner, the Marshall loop chamber accommodates a compressible gas collection zone 502 (a gas pocket) and a fluid zone 501 (a fluid pocket).

Gas will tend to escape the chamber through burp tube 442' as the gas-liquid interface between gas 502 and liquid 501 reaches the bottom termination of burp tube 442'. Adjusting the positioning of the terminating ends of tubes 442, 442', and 443 in such manner provides a means for adjusting the gas separation properties of the chamber. In the example of FIG. 5B, gas zone 502" is larger—greater volume—than gas zone 502' in the example of FIG. 5A. Burp tube 442", in this example, extends further downward into the chamber. In this example, entry transfer tube(s) 441 are extended longer and reach closer to the bottom of the chamber floor, sealing gasket 55. Exit transfer tubes 443 reach above the bottom termination of entry transfer tube(s) 441, yet remain below the bottom termination of the burp tube 442".

Brief Summary of an Example Structure—Separator Configuration "A".

Thus, a separator of configuration "A" in one example is described as a tubular housing (41) sized to fit around a production string (3). An orifice (42) is positioned in an upper portion of the tubular housing for receiving down-hole fluids. A first chamber (43) is positioned in the upper portion of the tubular housing (41) and is in fluid communication with the outside of the tubular housing (41) through the orifice (42). A first plurality of tubes (441) have first open ends positioned and arranged in the lower portion of the first chamber (43). A second chamber or series of second chambers (for example, 44 and/or 45) are positioned and arranged below the first chamber (43). The first plurality of tubes (441) have their second open ends positioned and arranged in the second chamber or series of second chambers (44 and/or 45). An orifice (442) in the second chamber (44 and/or 45) is positioned and arranged to expel gases. A second plurality of tubes (444) have their first open ends positioned and arranged in the second chamber or series of second chambers (44 and/or 45). A third chamber (shown in FIGS. 4F & 4G, 46 including bottom) is positioned and arranged below the second chamber or series of chambers (44 and/or 45). The second plurality of tubes (444) have second open ends positioned and arranged in the third chamber (shown in FIGS. 4F & 4G, 46 including bottom). An orifice (448) in the third chamber (46 including bottom) is positioned and arranged to expel gases. One or more orifices (1031 and/or 60) into a production string (3) are positioned and arranged in the third chamber (46 including bottom). In one example, the second open ends of the first plurality of tubes (441) are positioned and arranged above the first open ends of the second plurality of tubes (444). In one example, the one or more orifices (1031 and/or 60) into the production string (3) are positioned and arranged above the second open ends of the second plurality of tubes (444). In one example, the second chamber orifice (442) for expelling gases is positioned and arranged above both the second open ends of the first plurality of tubes (441) and the first open ends of the second plurality of tubes (444). In one example, the third chamber orifice (448) for expelling gases is positioned and arranged above both the second open ends of the second plurality of tubes (444) and the one or more orifices (1031 and/or 60) into the production string (3).

In one example, the second chamber or series of chambers (44 and/or 45) is comprised of two or more intervening chambers (44 and 45). The second open ends of the first plurality of tubes (441) are positioned and arranged in a first intervening chamber (44). The first open ends of the second plurality of tubes (444) are positioned and arranged in a last intervening chamber (45). In this example, for each pair of adjacent intervening chambers (44 and 45), a respective intervening plurality of tubes (443) have their first open ends positioned and arranged in the first intervening chamber (44) of the pair, with their second open ends disposed in the second intervening chamber (45) of the pair. In one example, an orifice (446) in one or more of the intervening chambers (45) is positioned and arranged to expel gases. In one example, the second open ends of the plurality of tubes (441, for example, or 443, for example) of each intervening chamber are positioned and arranged above the first end openings (443, for example, or 444, for example, respectively) of the plurality of tubes of that intervening chamber. In one example, each respective orifice for expelling gases (442, for example, or 446, for example) is positioned and arranged above both the second open ends of the plurality of tubes (441, for example, or 443, for example) of the respective intervening chamber and the first open ends of the plurality of tubes (443, for example, or 444, for example, respectively) of the respective intervening chamber.

Figure 6A:
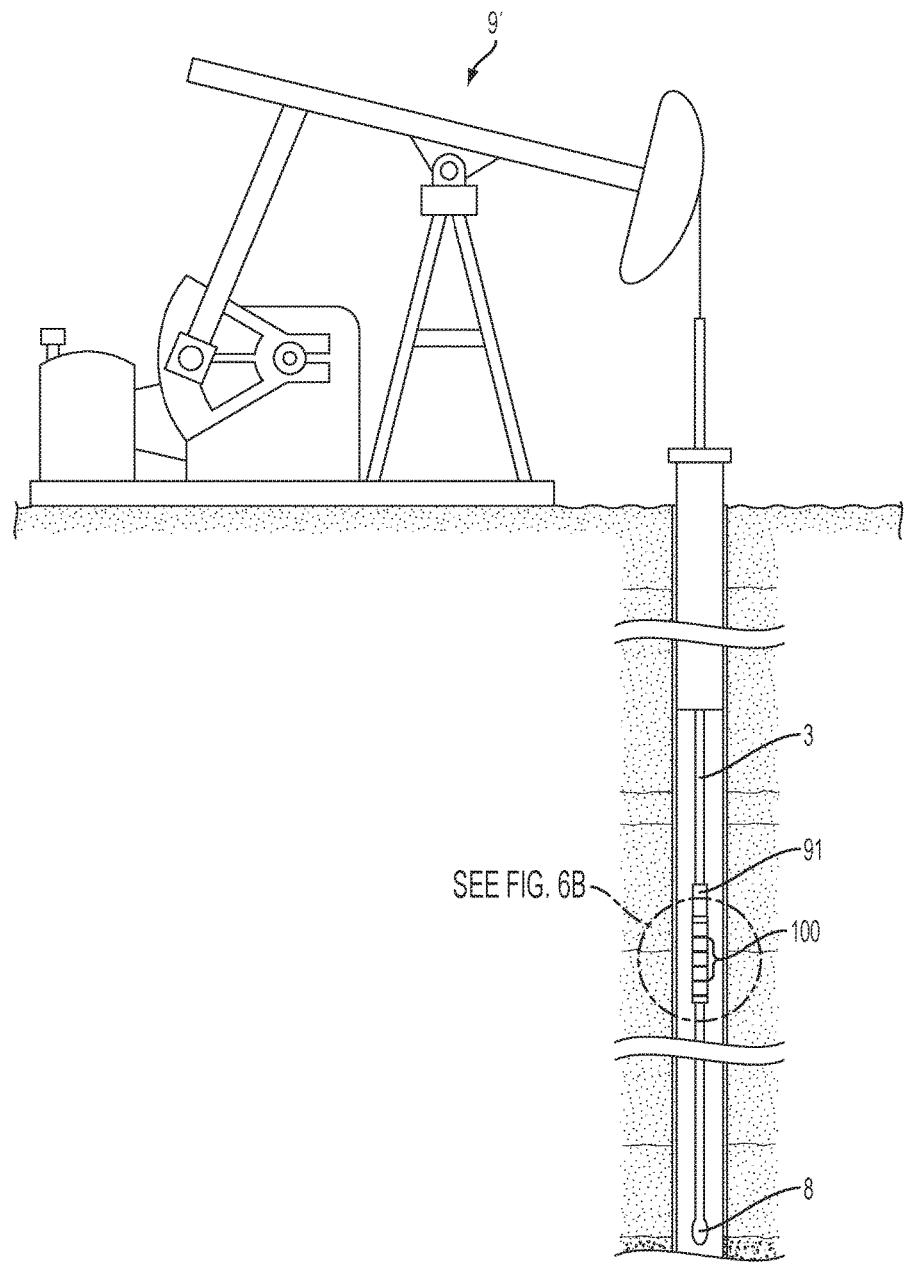
FIG. 6A illustrates a cross section elevation view of a production oil well with a pump jack and an example of the separator of configuration "B", in-hole, near a producing geologic formation. The location is indicated for closer in-well view 6B.

FIG. 6A illustrates a cross section elevation view of a production oil well with a pump jack and an example of the separator of configuration "B", in-hole, near a producing geologic formation. The location is indicated for closer in-well view 6B. A pump jack 9' is used to draw oil up from a production string 3 using a down-hole pump 91. In this example, separator 100 of configuration "B" is attached below down-hole pump 91. In this example, a gas anchor 8 is illustrated, attached beneath separator 100. In this example, the outside diameter of separator 100 is the same as the collar diameter of collar attachment to the down-hole pump 91. In one example, the outside diameter of separator 100 is four inches (4").

Figure 6B:
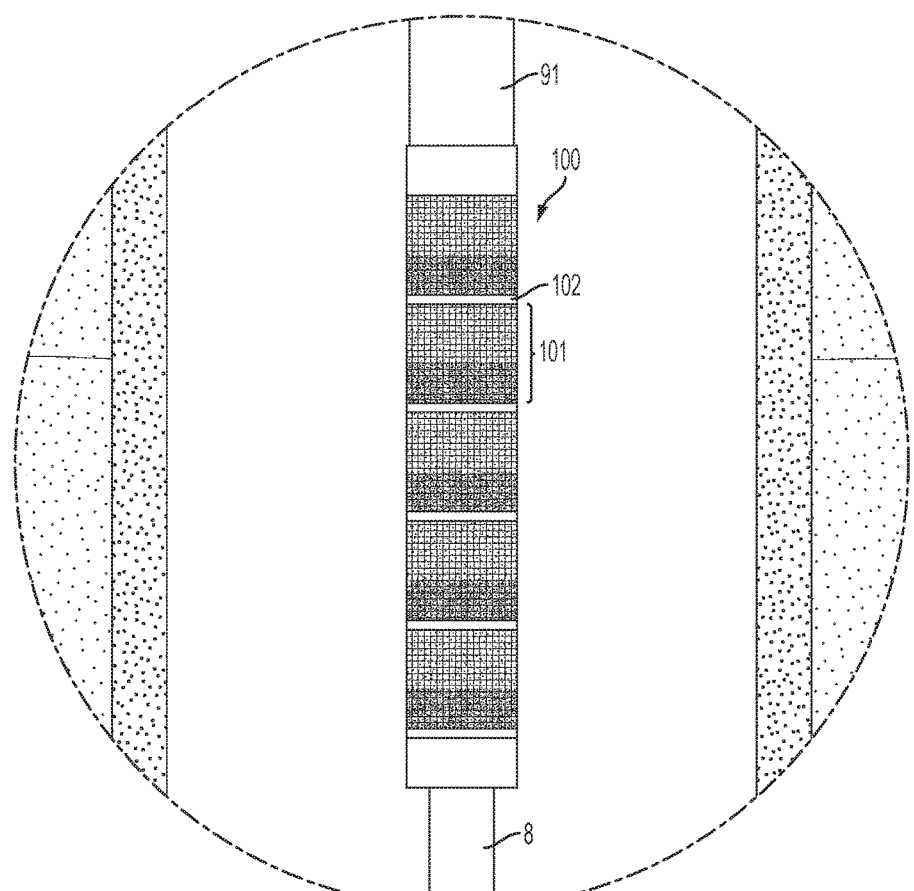
FIG. 6B illustrates a closer in-well elevation view of sections of the exterior of the separator of configuration "B".

FIG. 6B illustrates a closer in-well elevation view of sections of the exterior of the separator of configuration "B". The bottom of down-hole pump 91 attaches to the top of separator 100. The diameter of the attachment collar is the same as the diameter of the separator 100, preventing build-up of debris, paraffin, mud, or other undesired solids. The bottom of separator 100 attaches to a gas anchor 8. Separator 100, in this example, comprises a series of five screened containers, called "Stinger" cylinders 101. A gasket 102 is placed between each Stinger cylinder 101.

In one example, the production string is 2⅜ inch outside diameter with a connection collar outside diameter of four inches (4"). In one example, the outside diameter of the stinger cylinders 101 closely match the outside diameter of the production string connection collar. In one example, gaskets 102 also closely match the outside diameter of the stinger cylinders 101. This effects a relatively uniform outside diameter of the string, reducing buildup of unwanted solids around the stinger intake area (to be shown as the portion of outside sleeve 106 above silicone seal 107 in FIG. 10).

FIG. 7A illustrates a front vertical elevation view of the separator 100 of configuration "B" (the "Stinger", comprising five "Stinger cylinders" in this example), with location and viewing orientation indicated of vertical cut section view 7B. Stinger cylinders 101 are stacked, one on top of the other, with a non-perforated sealing gasket 102 placed between each pair of stacked Stinger cylinders 101. Although stacked, the Stinger cylinders act independently of one another.

FIG. 7B illustrates a vertical cut section view of FIG. 11A, looking to the right, relative to the displayed orientation of FIG. 7A. A production string 103 runs down the central axis of the stack of Stinger cylinders 101. In one example, production string 103 is 2⅜ inch outside diameter with a connection collar outside diameter of four (4) inches (J-55 pipe, for example). An outside screen sleeve 106 encloses the outer diameter of each Stinger cylinder 101. In one example, outside screen sleeve 106 has an outside diameter of four inches (4"). In one example, the outside diameter of outside screen sleeve 106 matches the outside diameter of the connection collar of the production string. In one example, outside screen sleeve 106 is a stainless steel wrap typically called a sand screen.

As illustrated, perforations 1031 are orifices in production string 103 for liquids to enter production string 103 from the annular region of each Stinger cylinder 101. In one example, perforations 1031 are pairs of rectangular slots, each approximately eight inches (8") high in the longitudinal direction and two inches (2") wide in the circumferential direction, separated by a one inch (1") space between the pair. In one example, the perforation orifice(s) are configured, positioned, and arranged to be of certain size and shape to meet structural considerations, for example totaling about seven square inches of orifice opening, and, for example, extending a few inches from the bottom end of the cylinder 101.

In the example as illustrated in this FIG. 7B, the bottom Stinger cylinder 101 has perforations 1031 disposed at relative angle 180 degrees on production string 103. The Stinger cylinder 101 next higher in the stack has perforations 1031 disposed at relative angle zero degrees (0 deg) on production string 103 and, hence, are not visible on the vertical cut section view of FIG. 7B. In the following manner, perforations 1031 are visible at relative angle 180 degrees for the middle and top Stinger cylinders 101 in the stack while the perforations 1031 are not visible at relative angle zero degrees (0 deg) for the fourth Stinger cylinder 101 in the stack.

A gasket 102 placed between each pair of stacked Stinger cylinders 101. In one example, gasket 102 is made of a synthetic rubber. In one example, gasket 102 is made of a synthetic rubber and fluoropolymer elastomer. In one example, gasket 102 is made of Viton, which is a registered trademark of DuPont Performance Elastomers L.L.C. In one example, gasket 102 is made of a fluoroelastomer categorized under the ASTM D1418 and ISO 1629 designation of FKM. Production string 103 sealingly passes through each gasket 102.

Figure 8:
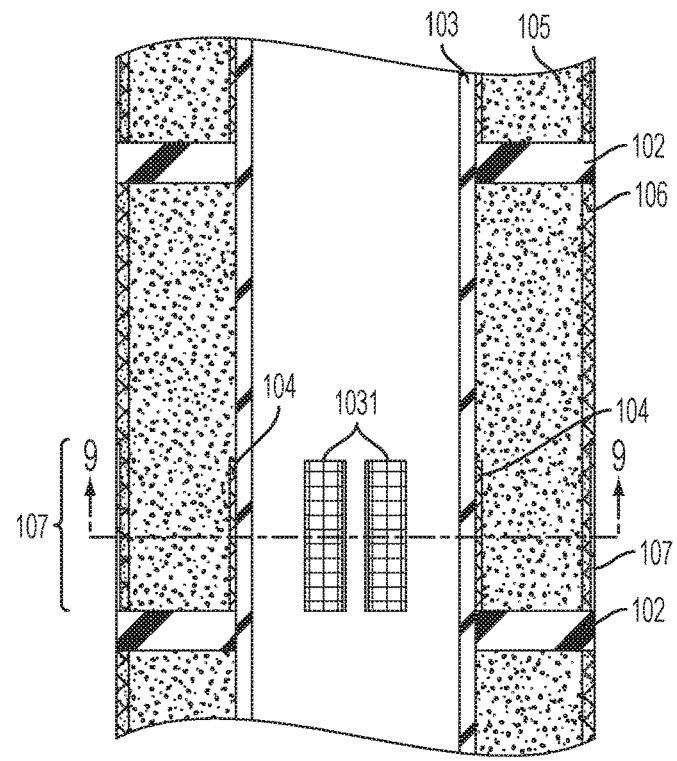
FIG. 8 illustrates a vertical cut section detail view to point out a single Stinger cylinder, with location and viewing orientation indicated of horizontal cut section view 9.
Figure 9:
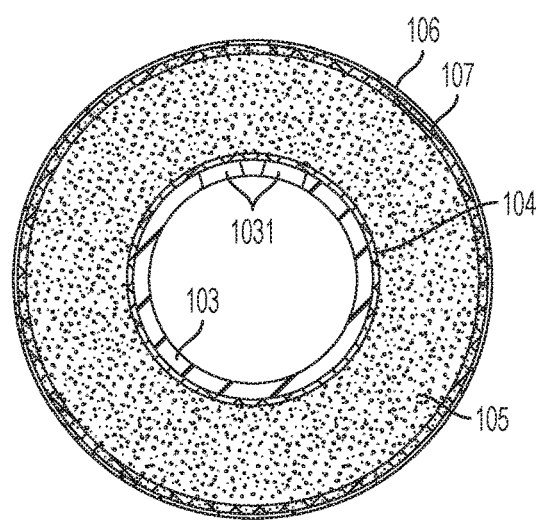
FIG. 9 illustrates a horizontal cut sectional view of FIG. 8.

FIG. 8 illustrates a vertical cut section detail view to point out a single Stinger cylinder, with location and viewing orientation indicated of horizontal cut section view 9. FIG. 9 illustrates a horizontal cut sectional view of FIG. 8. FIG. 9 is looking upward, relative to the displayed orientation of FIG. 8.

Stinger cylinder 101 is constructed between two sealing gaskets 102, the sealing gaskets 102 disposed on a production string 103. Between the two sealing gaskets 102, perforations 1031 serve as orifices into the inner pipe region of production string 103.

In one example, production string 103 is J-55 pipe having a two and three-eighths inch (2⅜") outside diameter with the spacing between the gaskets 102 being twelve inches (12") longitudinal distance.

A screen sift 104 is wrapped around production string 103 to cover the orifices of perforations 1031. In one example, screen sift 104 is a sand screen sift. In one example, sift 104 is stainless steel screen wrapped around the perforated pipe.

In one example, screen sift 104 is prepared in the following manner. An enamel-based polymer is painted onto the screen. After the polymer is partially ("half-way") set, the polymer is partially blown out through the screen orifices and perforations. After blowout, while still partially set, sand or equivalent is sprinkled on the remaining polymer that is disposed on the screen and perforations. In one example, No. 17 frac sand is used. In one example, screen sift 104 is epoxy coated, impregnated with a medium. In examples, the medium is glass, rocks, sand, ceramic, or other equivalent material.

Outside screen sleeve 106 is slid over the outside diameter of production string 103 which has disposed on it the sand sprinkled, polymer painted, screen sift 104 about the perforated orifices 1031. In one example, outside screen sleeve 106 is four inches (4") diameter. The annular region or cavity between the perforated production string 103 and the outside sleeve 106 is filled with a material 105 to enhance gas-liquid separation. In one example sand is used for material 105. In one example, material 105 is No. 17 sand. In one example, ceramic beads are used. In one example gravel is used. In other examples, combinations of materials are used, or other substitute substance.

For a distance from the bottom gasket 102 upward, the outer sleeve 106 is sealed with high temperature silicone 107. Silicone 107 seals this portion of the Stinger cylinder 101 such that a barrier to fluid entry is created in the bottom exterior portion of Stinger cylinder 101 where silicone 107 has been applied. In one example, the height of silicone 107 is higher than the height of screen sift 104 and perforations 1031. Thus, the perforation orifices 1031, which are now the polymer-coated screen 104 orifice to the production string 3, reside within this zone 107 where the outside screen is silicone coated. The silicone seal 107 terminates higher than the top of the orifices 1031. This forms an annular "cup" region, but this annular "cup region" is not protruding from the Stinger sub assembly 101 since the outside diameter of the assembly 101 and gaskets 102 are the same.

Gaskets 102 are disposed at the top and bottom of same diameter as outside sleeve 106, completing the construction of a Stinger cylinder assembly 101.

Figure 10:
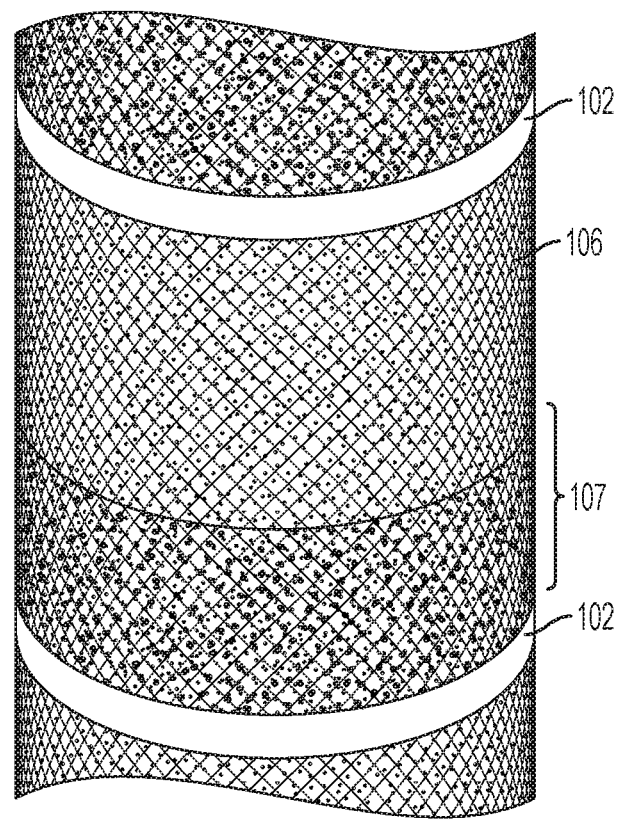
FIG. 10 illustrates a broken 3-D view of the outside surface of a single Stinger separator, showing one Stinger cylinder positioned and arranged between two other Stinger cylinders.

FIG. 10 illustrates a broken 3-D view of the outside surface of a single Stinger separator, showing one Stinger cylinder positioned and arranged between two other Stinger cylinders. In this illustrated example, silicone barrier 107 is shown covering the bottom portion of outside screen sleeve 106. Above the silicone barrier 107 zone is the untreated outside screen sleeve 106. Above and below outside screen sleeve 106 are sealing gaskets 102. From this illustration, it is apparent that gas-liquid mixtures enter the stinger cylinder only through outside screen sleeve 106 and only above the treated portion of silicone barrier 107.

Figure 11:
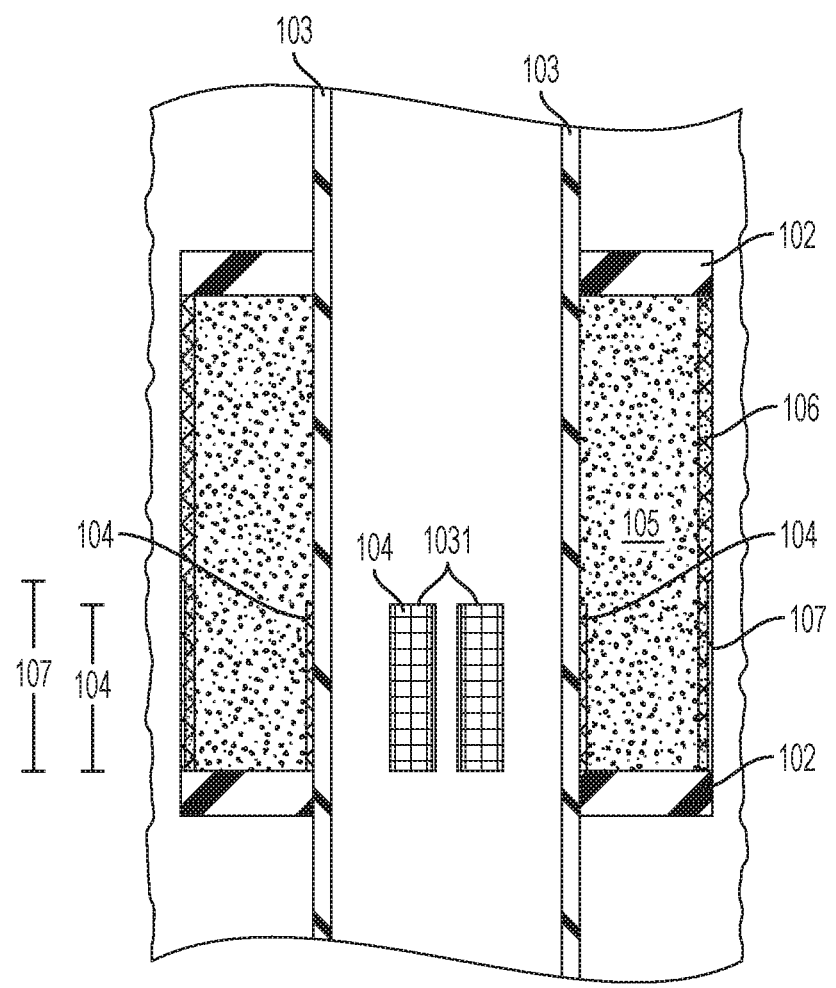
FIG. 11 illustrates a vertical cut section detail view of a single Stinger cylinder, detailing relative placement of sand sift screen wrap 104 and silicone seal 107.

FIG. 11 illustrates a vertical cut section detail view of a single Stinger cylinder, detailing relative placement of sand sift screen wrap 104 and silicone seal 107. As mentioned, the height of silicone barrier 107 region is higher than the height of treated screen sift 104 and perforations 1031. The silicone seal 107 terminates higher than the top of the orifices 1031. This forms an annular "cup" region, but this annular "cup region" is not protruding from the Stinger sub assembly 101 since the outside diameter of the assembly 101 and gaskets 102 are the same. This internal "cup" enables gas-liquid separation without the drawbacks of sticking, clogging, or filling encountered with an external "cup" where the outside diameter of an external "cup" separator varies in the longitudinal direction.

Brief Summary of Basic Operation—Separator Configuration "B".

In brief summary of operation of a Stinger cylinder 101, gas-liquid fluids in the annulus region of the well enter the top portion of the Stinger cylinder through the untreated portion of outer screen sleeve 106. As the pump draws from production string 103, the gas-liquid fluids travel downward through material 105. The surface area and surface properties of material 105 serve to enhance separation of the gas from the gas-liquid fluid. De-entrained gas is allowed to escape back into the annulus region of the well. The remaining treated fluid travels downward into the interior "cup" region that is formed by the silicone barrier 107 and prepared screen sift 104. The treated fluid still has opportunity for further gas separation, but is also prevented from re-entry into the annulus of the well due to the presence of silicone barrier 107. The prepared screen sift 104 further prevents loss of material 105 through perforations 1031 and serves to provide further opportunity for gas separation. The treated fluid is drawn by pump through prepared screen sift 104 and perforations 1031 into production string 103 for gathering as reduced-gas liquid product.

Special note is made of the inventor's discovery of the problem of cup separators and, upon inventor's belief in the problem, the inventor's work to solve the problem. The inventor seems to recall old experiments that included "cups" around a production pipe, open upward, therefore creating an upwardly open annular region around the pipe. Gaseous fluids would enter into the upwardly open "cup", providing time for gas to evolve before entering into the production pipe at the bottom of the "cup". This failed for various reasons, including the problem that the cup would fill with clay or sand or other debris and plug up. They would "sand up". The inventor believes that these problems caused practitioners to reject using cups, and the art to teach away from use of cups. This has bothered the inventor for many years. The inventor realized that moving the cup to be flush with the production collar, and pre-packing the cup with material (opposite of trying to maintain an open cup!) would sufficiently solve the clogging problem and reverse the disparaging reputation of the cup. Thus, discovery of the problem and solving with these improvements, realized significant unexpected and unobvious results and benefits.

Brief Summary of an Example Structure—Separator Configuration "B".

Thus, a separator of configuration "B" in one example is described as one or more stacked containers (101) positioned and arranged between one or more orifices (1031) into the production string (103). Each one or more stacked containers (101) includes a top barrier (102) disposed above one or more orifices (1031) into the production string (103) and a bottom barrier (102) disposed below one or more orifices (1031) into the production string (103). A first coated screen (104) is positioned and arranged across the one or more orifices (1031). A second screen (106) is disposed between the top barrier (102) and the bottom barrier (102) and positioned and arranged to form an exterior surface of the container (101), forming a volume. A fluid barrier material (107) is disposed about a lower portion of the second screen (106), forming a cup within the volume between the first coated screen (104) and the second coated screen (106). A second material (105) disposed in the volume between the first coated screen (104) and the second coated screen (106). In one example, the second material (105) includes of one or more of the following: sand, No. 17 sand, ceramic beads. In one example, the first coated screen (104) includes a screen coated with epoxy, the epoxy impregnated with a medium. In one example, the medium includes one or more of the following: sand, No. 17 sand, ceramic, glass, rocks.

Separator Configuration "C".

FIG. 12A illustrates a front vertical elevation view of the separator 4' of configuration "C", with location and viewing orientation indicated of vertical cut section view 12B. A placement of separator 4' in a down-hole environment is shown by similar example in FIG. 1. FIGS. 1 through 4 illustrate a separator of configuration "A", characterized in the use of "Marshall loops" and a delivery chamber. FIGS. 6 through 11 illustrate a separator of configuration "B", a "Stinger", characterized in the construction of internal "cups". Each configuration "A" or "B" has application in certain situations, depending on the production conditions and/or economics of the well. For certain situations, depending on the production conditions and/or economics, a separator of configuration "C" is configured to enable combining of "Marshall loops" and "Stinger", the delivery chamber configured house a stack of one or more Stinger cylinders. In the example as illustrated in this FIG. 12A, the exterior of separator 4' appears much the same as the configuration "A" separator 4 of FIG. 2A. Both configuration "A" and "C" use an exterior shroud 41 and, in one example, debris screen 42. In examples, the total length of separator 4' (and shroud 41) is longer or shorter, depending on the number of Marshall loops and/or depending on the number of Stinger cylinders used. Therefore, configuration "C" is the combination of configuration "A" and configuration "B". One advantage, in one example, is that Stinger cylinders are attachable to a configuration "A" system, or removable from a configuration "C" system, reducing capital and inventory costs.

Figure 13:
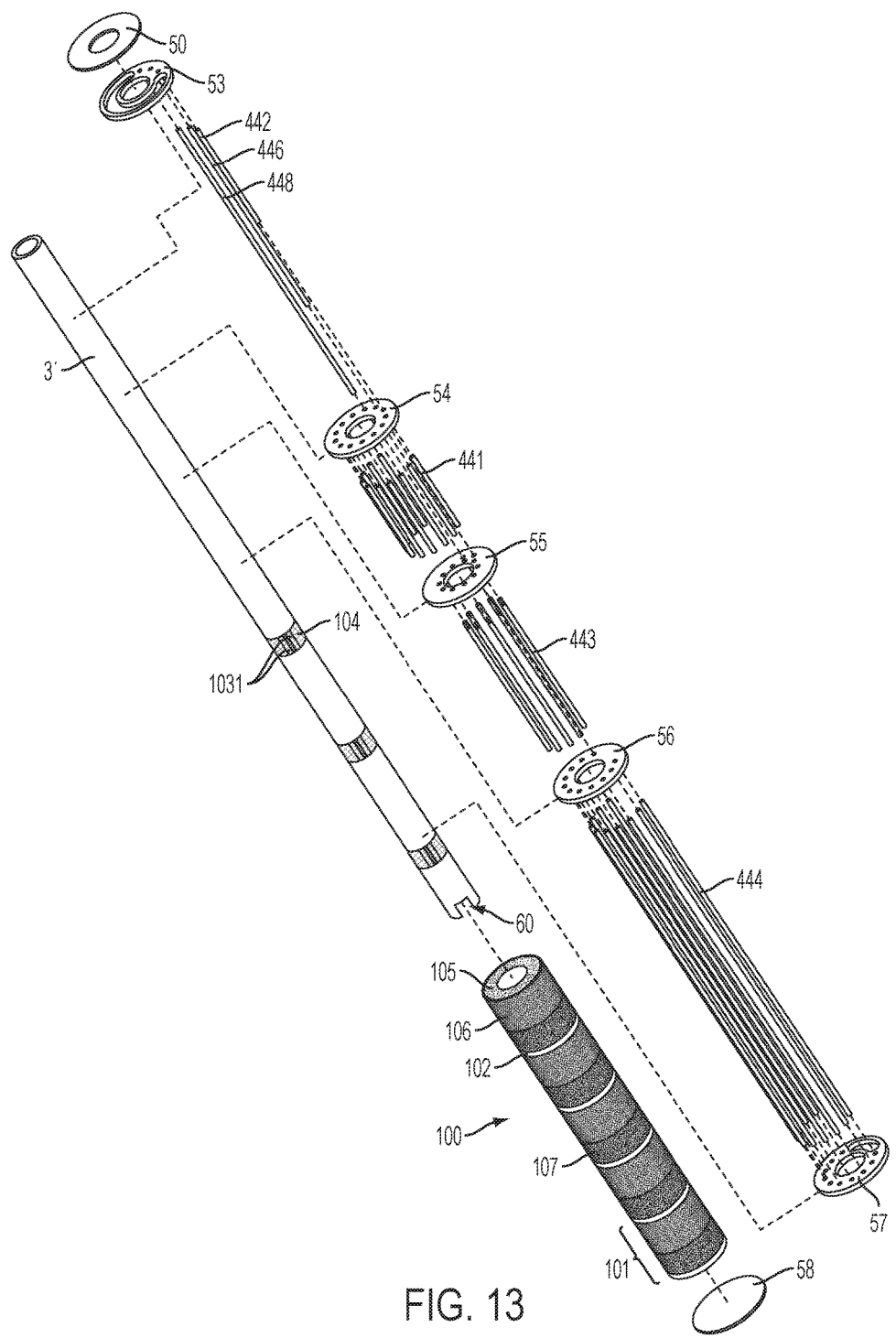
FIG. 13 illustrates an exploded 3-D view of the separator of configuration "C", in this example illustrating two Marshall loop cylinder areas and five Stinger cylinders.

FIG. 12B illustrates a vertical cut section view of FIG. 12A, looking to the right, relative to the displayed orientation of FIG. 12A. FIG. 12B illustrates staging area 43, first Marshall loop cylinder area 44, second Marshall loop cylinder area 45, and delivery chamber area 46 configured with five Stinger cylinders 101. Production cylinder 3' corresponds to 103 in FIGS. 7B, 8, 9, 11 and 3 in FIGS. 3A-3G and 4A-4G. FIG. 12B is oriented so as to illustrate burp tubes 442, 446, and 448. FIG. 13 further illustrates an exploded 3-D view of the separator of configuration "C", in this example illustrating two Marshall loop cylinder areas and five Stinger cylinders.

As shown in this example, burp tube 442 relieves gas from Marshall loop cylinder area 44, burp tube 446 relieves gas from Marshall loop cylinder area 45, and burp tube 448 relieves gas from delivery chamber area 448. Delivery chamber tubes 444, in this example, are flexible and bend slightly around Stinger cylinders 101 to accommodate the space required for the cylinders. Perforation orifices 1031 in production string 3' are positioned to match the stack of Stinger cylinders 101 such that perforation orifices 1031 are located in the bottom portion of each Stinger cylinder 101.

Brief Summary of Basic Operation—Separator Configuration "C".

In summary of operation of configuration "C", the initial action of separator 4' is much the same as that of previously described separator "A" of separator 4. In one example, debris screen 42 (located near the top of separator 4') prevents large solids from entering separator 4'. Gas-liquid fluid mixture enters through the opening near the top, intake-exhaust slot 5 (debris screen 42) into staging area 43 and must travel downward through entry tubes 441 in order to be eventually drawn into productions string 3'. In doing so, the gas-liquid fluid mixture must encounter changes in direction of travel and changes in volume and pressure through one or more Marshall loop chamber areas, as previously described herein. Gases may become separated in each of the chamber areas (in this illustrated example, chamber areas 43, 44, 45, 46). In examples, separated gases escape by one or more burp tubes, in this illustrated example, burp tubes 442, 446, 448. The positioning and arrangement of the tubes and burp tubes enables configuration of the gas accumulation properties of each chamber. Eventually, the treated fluid exits the tubes into the bottom portion of delivery chamber area 46.

In one example, perforation slots 60 in the lower end of production string 3' enable the treated fluid entry onto production string 3'. In one example, perforation slots 60 are used to guard against pump starvation in the event other openings into production string 3' become clogged or otherwise restricted. In one example, perforation slots 60 are not used. In one example, perforation slots 60 are replaced with a variable or movable opening that is responsive to pull from the pump.

As the delivery chamber 46 is filled with treated gas-liquid fluid mixture, the treated gas-liquid fluid mixture enters one or more Stinger cylinders 101 through each respective screen 106. The gas-liquid fluid mixture encounters material 105 and travels through the interior cup region of the Stinger cylinder 101. Remaining gases that are de-entrained by material 105 are allowed to escape back into delivery chamber 46, where burp tube 448 relieves the gas in delivery chamber 46 into staging area 43 for eventual escape into the annular region of the well. The fluid within the interior cup region of each Stinger cylinder 101 is drawn through sift 104 and through perforation orifice 1031 into production string 3' where the pump gathers the treated fluid for production to topside.

Starvation Avoidance.

Perforation slot 60 at the bottom of production string 3 serves to prevent starving of the pump should the stinger cylinders become clogged. For instance, should paraffin build up in the stinger cylinders, if the cups plug, then production through the stinger cylinders may be reduced. Thus, perforation slot 60 serves as a relief opening to guarantee a minimum flow to prevent starvation of the pump. In one example, perforation slot 60 is not used, production string 3 being simply welded to the bottom plate. In one example, perforation slots 60 are replaced with a variable or movable opening that is responsive to pull from the pump. In one example, means to open, close, or vary the amount of bottom-opening (in place of perforation slot 60) is used to regulate the amount of suction relief needed. In one example, a demand suction valve is used. In one example, a ball and seat is used to provide relief. In one example, a spring-loaded ball and seat is used in place of the simple opening of perforation slot 60. Other equivalent structures may be envisioned. In one example, a ball and seat is used to provide relief. In one example, a ball, seat, and cage regulates the relief opening.

In one example, a bottom check valve is used to close perforation slot 60 to allow a back wash through the 1031 holes. In one example, means to open, close, or vary the amount of bottom-opening are part of a purging system. In one example, a cylinder or ring is disposed to cover perforation slots to act as an anti-starvation ring. In one example, the cylinder or ring is configured to be spring loaded such that the orifice area of the perforation slots increases as the demand or draw of the pump increases due to viscosity or eventual partial clogging of the stinger cups (reduced fluid flow from the other orifices).

Figure 14:
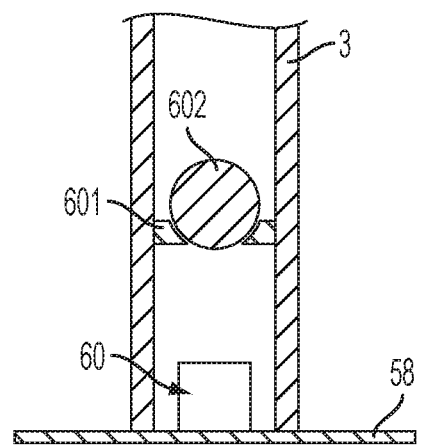
FIG. 14 illustrates a cross section view of an example suction relief valve.

FIG. 14 illustrates a cross section view of an example suction relief valve. In this example, perforation slots 60 is positioned at the bottom end of production string 3, with the bottom end of production string 3 attached to bottom plate 58. For clarity, the other components of the separator are not illustrated. A seat 601 and ball 602 combination is positioned and arranged to seal perforation slots 60 and the surrounding bottom end area portion of production string 3 from the upper interior portion of production string 3. In one example, ball 602 prevents fluid back flow from upper interior portion of production string 3 into the surrounding bottom end area portion of production string 3, preventing fluid outflow from production string 3 through perforation slots 60. Thus, back flow is allowed to flush the Stinger cylinders and/or delivery chamber when the pump is turned off. Should the pump meet with insufficient fluid draw, the ball 601 will be lifted, enabling additional fluid to enter the upper interior portion of production string 3, preventing starvation of the pump.

Burp Tube Bus.

In one example, burp tubes 442, 446, 448 are combined to form a "bus" (not illustrated). To effect the bus, the combined tubes are combined into a single tube (or, for example, a reduced number of tubes). The single tube, or reduced number of tubes, are perforated at locations where the operator wishes to bleed gas into the burp tube bus. In one example, the burp tube bus is perforated near the top of one or more of each sealed cylinder or delivery area. Where a large number of cylinder chambers are required, for example, a burp tube bus is used to reduce the physical space requirements imposed by use of a large number of burp tubes.

Discussion of an Example of Operation.

As gaseous liquid enters the separator shroud through the shroud intake/exhaust, gravity and hydrostatic forces the liquid into a staging area. Positive atmosphere pressure allows the staging area to fill with liquid. Inside the staging area, pressure changes from positive atmosphere/hydrostatic pressure to negative pressure caused by the pump draw pressure. The liquid is sucked into entry transfer tubes at the bottom of the staging area and forced downward through the tubes, where gas begins to break out of solution. Some gas breaks into bubbles and they move upward into the staging area where they are released through the intake/exhaust screen, separator shroud, and into the annulus. Gaseous liquid is drawn downward in tubes until the gaseous liquid is released into the Marshall Loop cylinder. Inside the Marshall Loop cylinder, the volume area is increased—decreasing pressure from the tubes to the cylinder—and flow direction is reversed from downward to upward.

As the cylinder begins to fill with liquid, the gas that is breaking inside the Marshall loop cylinder rises to the top of the cylinder. As the gas builds a gas pocket in the top of the cylinder, the fluid level is pushed downward. This is where each cylinder gets its own pressure. A burp tube that begins in the top of the staging area extends through the gasket at the top of the first Marshall Loop cylinder and dips into the Marshall Loop cylinder to a pre-determined depth. As the air pocket forces the fluid level downward in the cylinder, the bottom of the gas packet reaches the burp tube, allowing gas to be released upward from the Marshall loop cylinder through the burp tube and into the top of the staging area where gas escapes out of the top of the intake/exhaust, debris screen and is reintroduced to the annulus in a gaseous or bubble state.

As the fluid level rises in the cylinder, the fluid is taken into the exit transfer tubes where again pressure, direction of flow, and velocity of liquid change. The liquid travels downward through the exit transfer tubes. The exit tubes travel through a gasket at the bottom of the Marshall Loop cylinder, which also seconds as the top of the second Marshall Loop cylinder number 1 and become the entry tubes for cylinder number 2. In examples, there can be ten, twenty, thirty multiple cylinders, each with their own pressure and fluid level determined by the depth of each burp tube. This process repeats itself until the liquid is allowed into the stinger chamber (the delivery chamber). When liquid enters the stinger chamber, long tubes take the liquid to the bottom of the chamber where some liquid is allowed into the production string by non-restricted perforations at the bottom of the stinger and allow some unrestricted travel of gas-free liquids to enter the production string.

As fluid begins to fill the stinger chamber, fluid is sucked through the stainless sand screen and enters the medium filled with sand, ceramic bead, glass, or other selected material deposited in the area of cavity. Gaseous liquid is forced in a circular and downward direction through the medium toward the internal perforations of the stinger cylinders, the downward direction is caused by high temperature silicone cups made on the lower part of each cylinder.

As the fluid passes through the internal medium, any remaining gas is released to the top of the stinger chamber where the gas is allowed to escape the cylinder through the stinger chamber burp tube. Gas-free liquid is sucked into the production string through the sift screen and perforations in the bottom of the stinger cylinder cups.

In summary, herein disclosed are particular structural means for forcing the de-gassing of the gaseous liquid, including means for changing the velocity of the gaseous liquid (speed changes on each exit from the tubes owing to the volume difference between the tubes and the chamber), means for changing the direction of the gaseous liquid (owing to the flow changing direction from exiting one set of tubes to travel to the opening to enter the next set of tubes), and means for changing the pressure of the gaseous liquid (owing perhaps in part to evolution of gas upon entering increased volume).

These and other objectives, features, and advantages of the present invention will become apparent from the following detailed drawings and associated description that accompanying the drawings.

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

The invention claimed is:

1. An apparatus for gas separation from down-hole fluids comprising:
   a tubular housing sized to fit around a production string;
   an orifice positioned in an upper portion of the tubular housing for receiving down-hole fluids;
   a first chamber positioned in the upper portion of the tubular housing, in fluid communication with the outside of the tubular housing through the orifice;
   a first plurality of tubes having first open ends positioned and arranged in the lower portion of the first chamber;
   a second chamber or series of second chambers positioned and arranged below the first chamber, the first plurality of tubes having second open ends positioned and arranged in the second chamber or series of second chambers;
   an orifice in the second chamber positioned and arranged to expel gases;
   a second plurality of tubes having first open ends positioned and arranged in the second chamber or series of second chambers;
   a third chamber positioned and arranged below the second chamber or series of chambers, the second plurality of tubes having second open ends positioned and arranged in the third chamber;
   an orifice in the third chamber positioned and arranged to expel gases;
   one or more orifices into a production string, positioned and arranged in the third chamber;
   wherein the second open ends of the first plurality of tubes are positioned and arranged above the first open ends of the second plurality of tubes;
   wherein the one or more orifices into the production string are positioned and arranged above the second open ends of the second plurality of tubes;
   wherein the second chamber orifice for expelling gases is positioned and arranged above both the second open ends of the first plurality of tubes and the first open ends of the second plurality of tubes; and
   wherein the third chamber orifice for expelling gases is positioned and arranged above both the second open ends of the second plurality of tubes and the one or more orifices into the production string.

2. The apparatus of claim 1 wherein the second chamber or series of chambers is comprised of two or more intervening chambers wherein:
   the second open ends of the first plurality of tubes are positioned and arranged in a first intervening chamber;
   the first open ends of the second plurality of tubes are positioned and arranged in a last intervening chamber; and further comprising:
   for each pair of adjacent intervening chambers, a respective intervening plurality of tubes having first open ends positioned and arranged in the first intervening chamber of the pair and second open ends disposed in the second intervening chamber of the pair;
   an orifice in one or more of the intervening chambers positioned and arranged to expel gases; and
   wherein the second open ends of the plurality of tubes of each intervening chamber are positioned and arranged above the first end openings of the plurality of tubes of that intervening chamber; and
   wherein each respective orifice for expelling gases is positioned and arranged above both the second open ends of the plurality of tubes of the respective intervening chamber and the first open ends of the plurality of tubes of the respective intervening chamber.

3. An apparatus for gas separation from down-hole fluids comprising:
   a pipe,
   a shroud disposed around the pipe;
   a plate disposed in the annulus between the shroud and the pipe, forming a sealing top wall;
   a top chamber comprising the shroud and the pipe and the sealing top wall of the plate, the top chamber disposed longitudinally along the annular volume between the shroud and the pipe;
   one or more orifices in the shroud, opening into the top chamber;
   a bottom chamber disposed longitudinally along the annular volume between the shroud and the pipe;
   one or more orifices in the pipe, opening into the bottom chamber;
   an intermediate chamber disposed longitudinally along the annular volume between the shroud and the pipe between the top chamber and the bottom chamber;
   a first plurality of tubes having a first set of ends disposed in the top chamber and a second set of ends disposed in the intermediate chamber, providing fluid communication between the top chamber and the intermediate chamber; and
   a second plurality of tubes having a first set of ends disposed in the intermediate chamber and a second set of ends disposed in the bottom chamber, providing fluid communication between the intermediate chamber and the bottom chamber.

4. The apparatus of claim 3 further comprising an orifice in the intermediate chamber positioned and arranged to expel gases.

5. The apparatus of claim 3 further comprising an orifice in the bottom chamber positioned and arranged to expel gases.

6. The apparatus of claim 3 further comprising an orifice in the intermediate chamber positioned and arranged to expel gases and an orifice in the bottom chamber positioned and arranged to expel gases.

7. The apparatus of claim 3 wherein the intermediate chamber comprises:
   a plurality of sequential longitudinally adjacent chambers; and
   a plurality of tubes disposed between each adjacent pair of sequential adjacent chambers, providing fluid communication between the adjacent pairs of chambers.

8. The apparatus of claim 7 further comprising an orifice in the intermediate chamber positioned and arranged to expel gases.

9. The apparatus of claim 7 further comprising an orifice in the bottom chamber positioned and arranged to expel gases.

10. The apparatus of claim 7 further comprising an orifice in the intermediate chamber positioned and arranged to expel gases and an orifice in the bottom chamber positioned and arranged to expel gases.

\* \* \* \* \*